US010553895B2

(12) United States Patent
Ihara et al.

(10) Patent No.: US 10,553,895 B2
(45) Date of Patent: Feb. 4, 2020

(54) SECONDARY BATTERY-USE ELECTROLYTIC SOLUTION, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: Murata Manufacturing Co., Ltd., Kyoto (JP)

(72) Inventors: Masayuki Ihara, Fukushima (JP); Shigeru Fujita, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 122 days.

(21) Appl. No.: 15/523,535

(22) PCT Filed: Nov. 17, 2015

(86) PCT No.: PCT/JP2015/082214
§ 371 (c)(1),
(2) Date: May 1, 2017

(87) PCT Pub. No.: WO2016/098508
PCT Pub. Date: Jun. 23, 2016

(65) Prior Publication Data
US 2018/0277886 A1    Sep. 27, 2018

(30) Foreign Application Priority Data
Dec. 16, 2014    (JP) .................................. 2014-253927

(51) Int. Cl.
*H01M 10/0525* (2010.01)
*H01M 10/0568* (2010.01)
(Continued)

(52) U.S. Cl.
CPC ........... *H01M 10/0525* (2013.01); *B25F 5/00* (2013.01); *B60L 50/64* (2019.02); *H01M 10/052* (2013.01);
(Continued)

(58) Field of Classification Search
CPC combination set(s) only.
See application file for complete search history.

(56) References Cited

U.S. PATENT DOCUMENTS 8,900,753 B2    12/2014  Konishi et al.
2012/0132849 A1   5/2012  Fan
(Continued)

FOREIGN PATENT DOCUMENTS

JP    2008-159865 A    7/2008
JP    2014-005261 A    1/2014
(Continued)

OTHER PUBLICATIONS

International Search Report (with English translation) dated Feb. 9, 2016 in corresponding international application No. PCT/JP2015/082214 (5 pages).
(Continued)

*Primary Examiner* — Alexander Usyatinsky
(74) *Attorney, Agent, or Firm* — K&L Gates LLP

(57) ABSTRACT

A secondary battery includes a cathode, an anode, and an electrolytic solution including a cyano compound.

16 Claims, 7 Drawing Sheets

(51) Int. Cl.
  *H01M 10/052* (2010.01)
  *B60L 50/64* (2019.01)
  *B25F 5/00* (2006.01)
  *H01M 10/0567* (2010.01)
  *H01M 10/42* (2006.01)
  *H01M 10/48* (2006.01)
  *H01M 10/0569* (2010.01)

(52) U.S. Cl.
  CPC ... *H01M 10/0567* (2013.01); *H01M 10/0568* (2013.01); *H01M 10/0569* (2013.01); *H01M 10/425* (2013.01); *H01M 10/486* (2013.01); *Y02E 60/122* (2013.01); *Y02T 10/7011* (2013.01)

(56) References Cited

U.S. PATENT DOCUMENTS

| | | | | |
|---|---|---|---|---|
| 2012/0328930 A1* | 12/2012 | Inagaki | ............... | H01M 4/485 |
| | | | | 429/163 |
| 2013/0177799 A1* | 7/2013 | Ihara | ............... | H01M 10/052 |
| | | | | 429/150 |
| 2013/0295449 A1* | 11/2013 | Kobatake | ............... | H01G 11/62 |
| | | | | 429/200 |
| 2014/0113202 A1* | 4/2014 | Sun | ............... | H01M 10/052 |
| | | | | 429/328 |
| 2015/0056511 A1 | 2/2015 | Takamatsu et al. | | |

FOREIGN PATENT DOCUMENTS

| | | |
|---|---|---|
| JP | 2014-022291 A | 2/2014 |
| JP | 2014-199792 A | 10/2014 |

OTHER PUBLICATIONS

Written Opinion dated Feb. 9, 2016 in corresponding international application No. PCT/JP2015/082214 (3 pages).
Chinese Office Action dated Jan. 18, 2019, for corresponding Chinese Application No. 201580067368.2.
Japanese Office Action dated Jun. 27, 2019 in corresponding Chinese Application No. 201580067368.2.
Japanese Office Action dated Jun. 11, 2019 in corresponding Japanese Application No. 2016-564742.
European Search Report dated Jul. 1, 2019 in corresponding European Application No. 16872616.4.

* cited by examiner

[ FIG. 1 ]
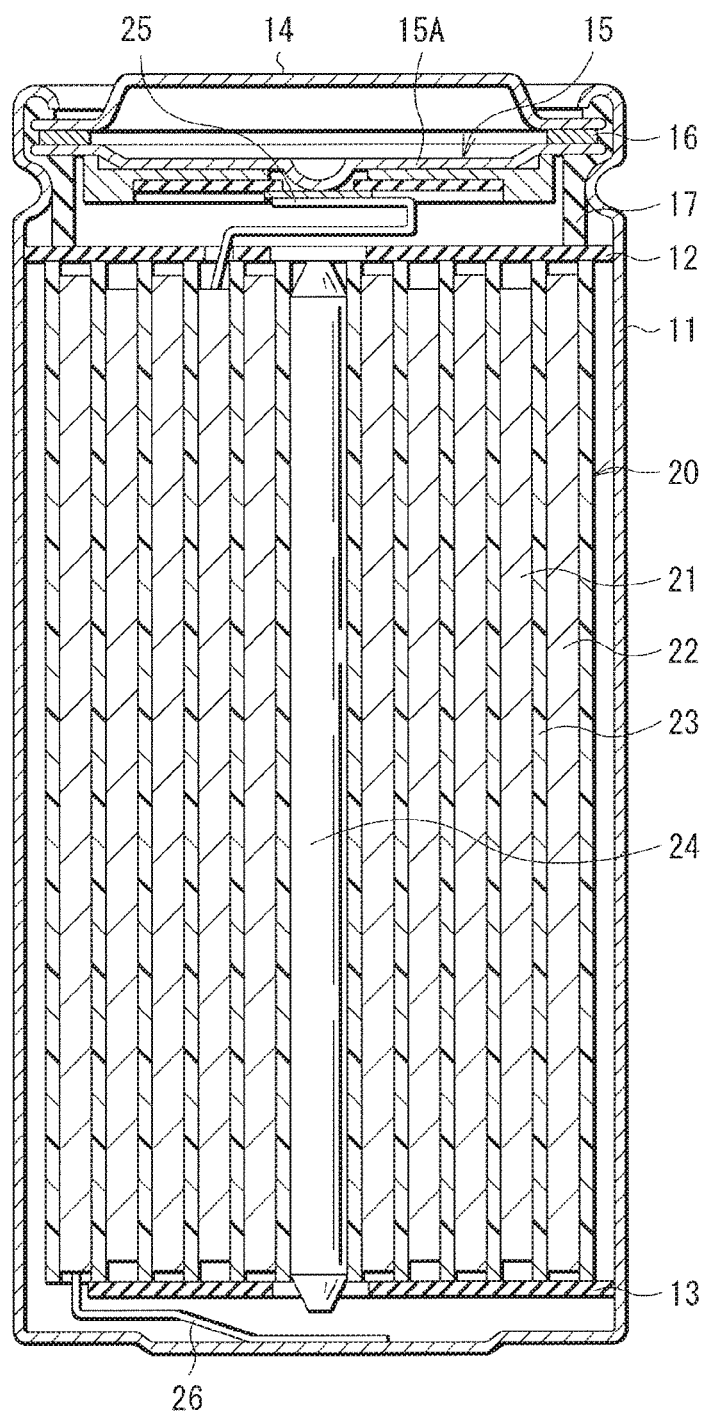

[ FIG. 2 ]
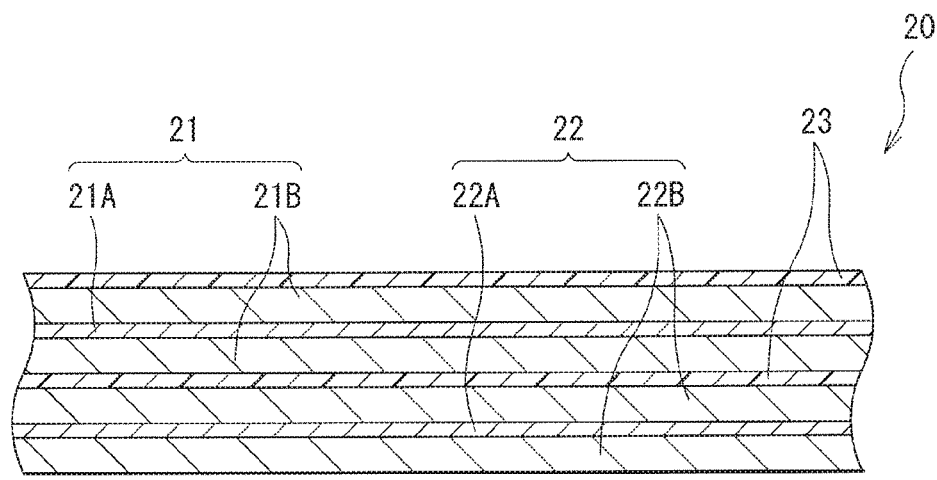

[ FIG. 3 ]
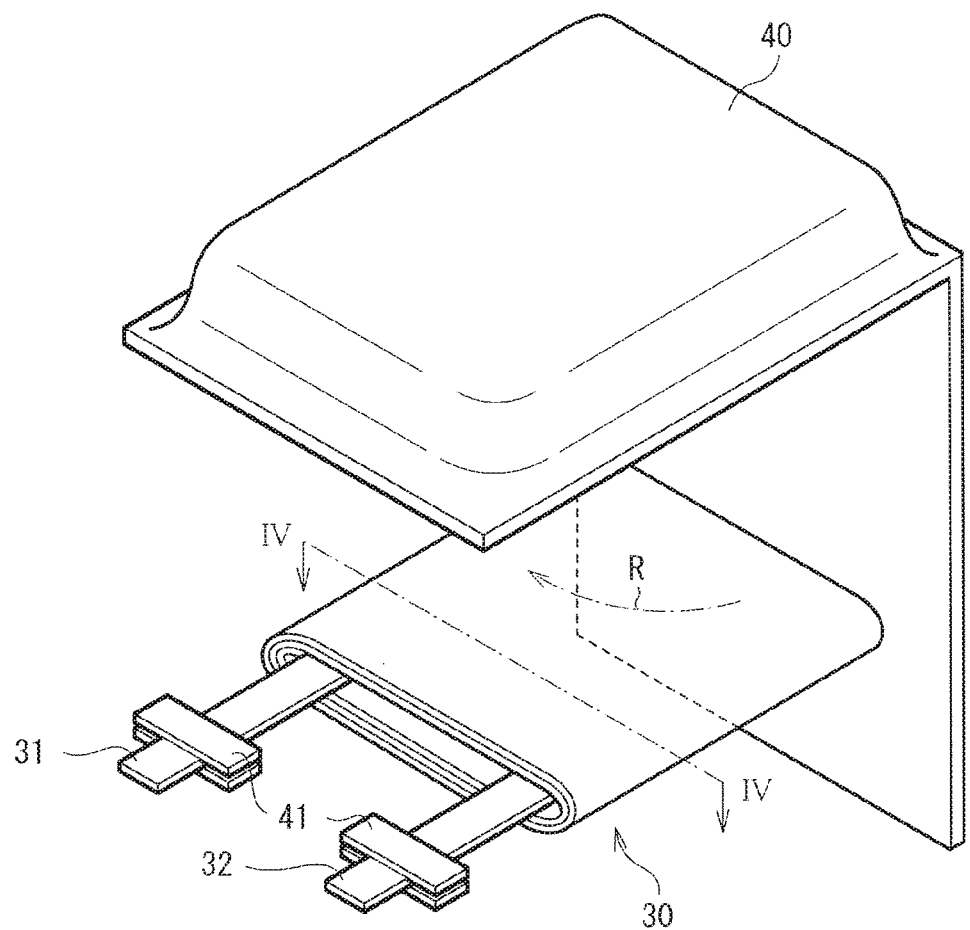

[ FIG. 4 ]
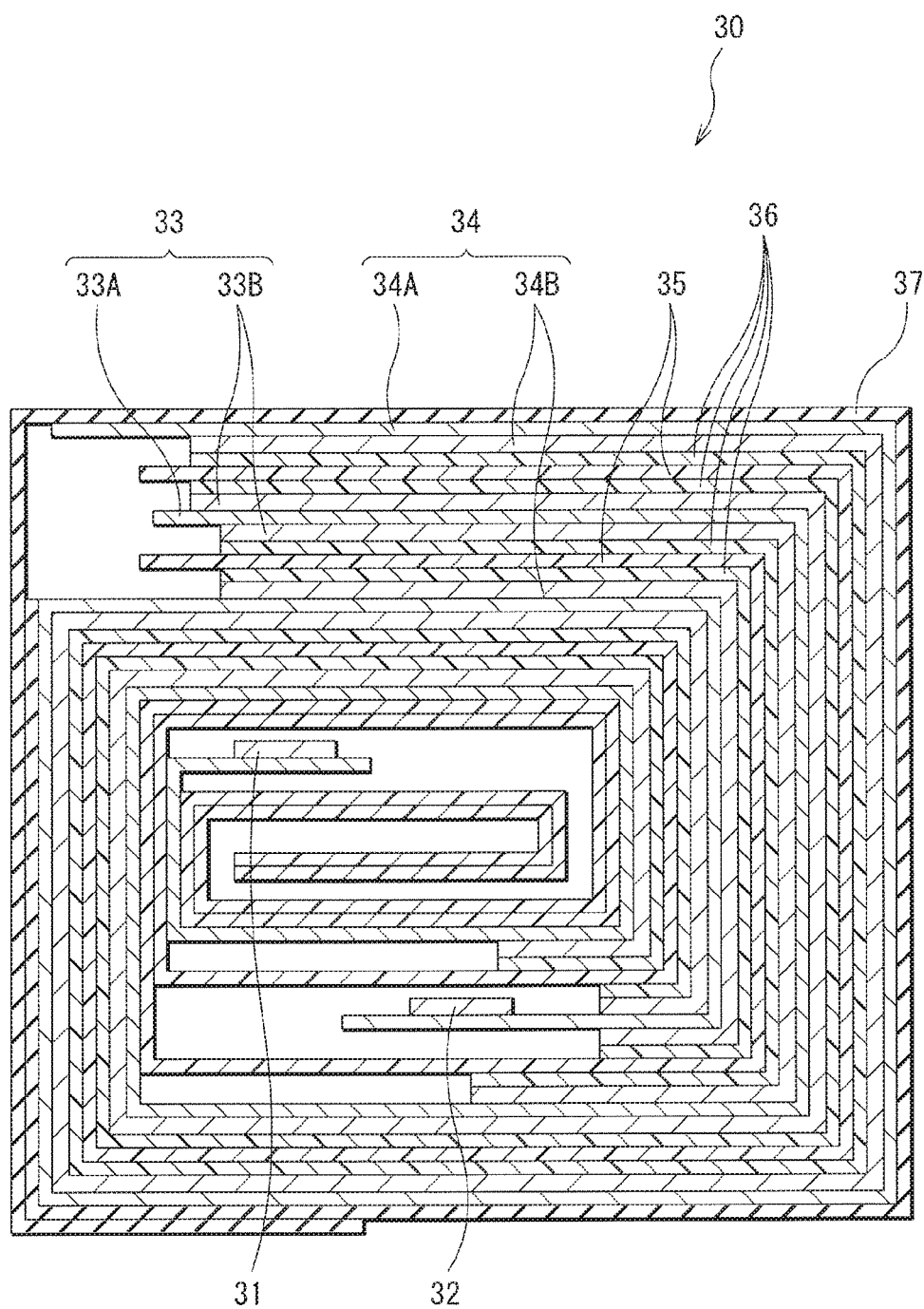

[FIG.5]
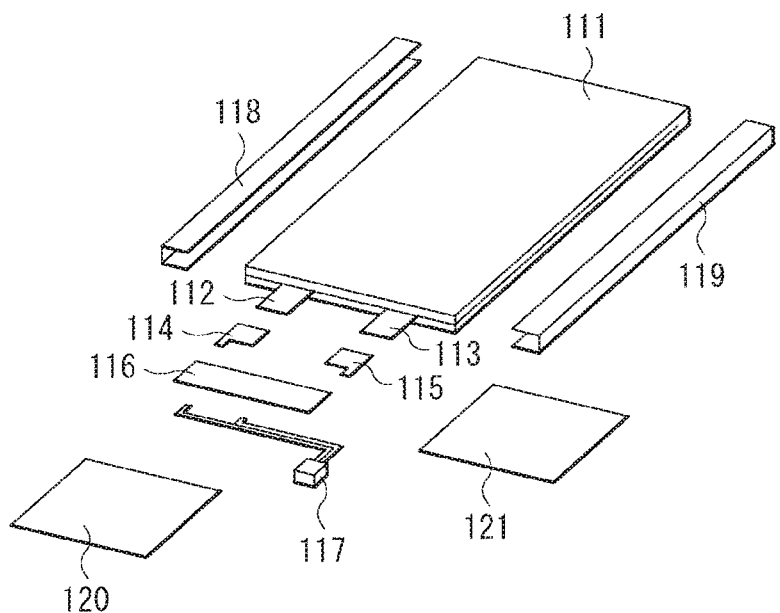
[FIG.6]
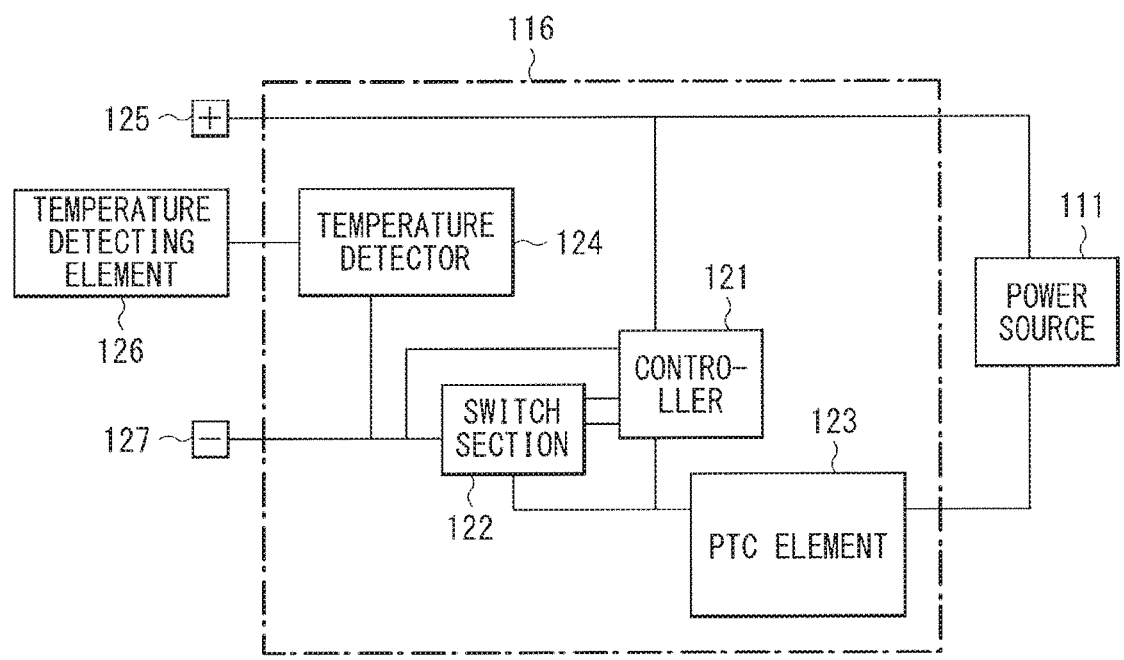

[ FIG. 7 ]
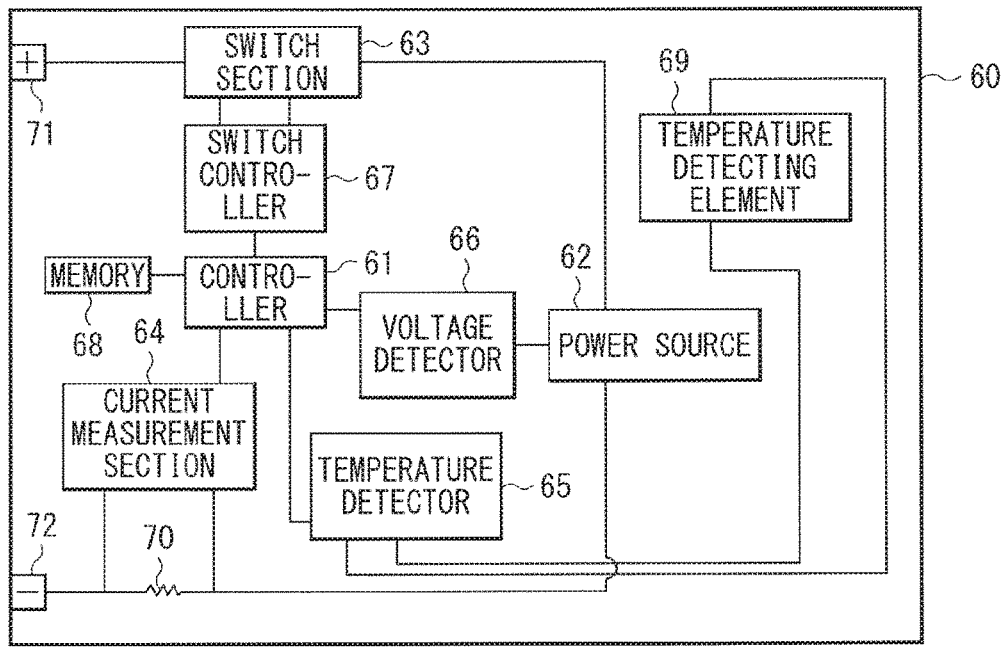
[ FIG. 8 ]
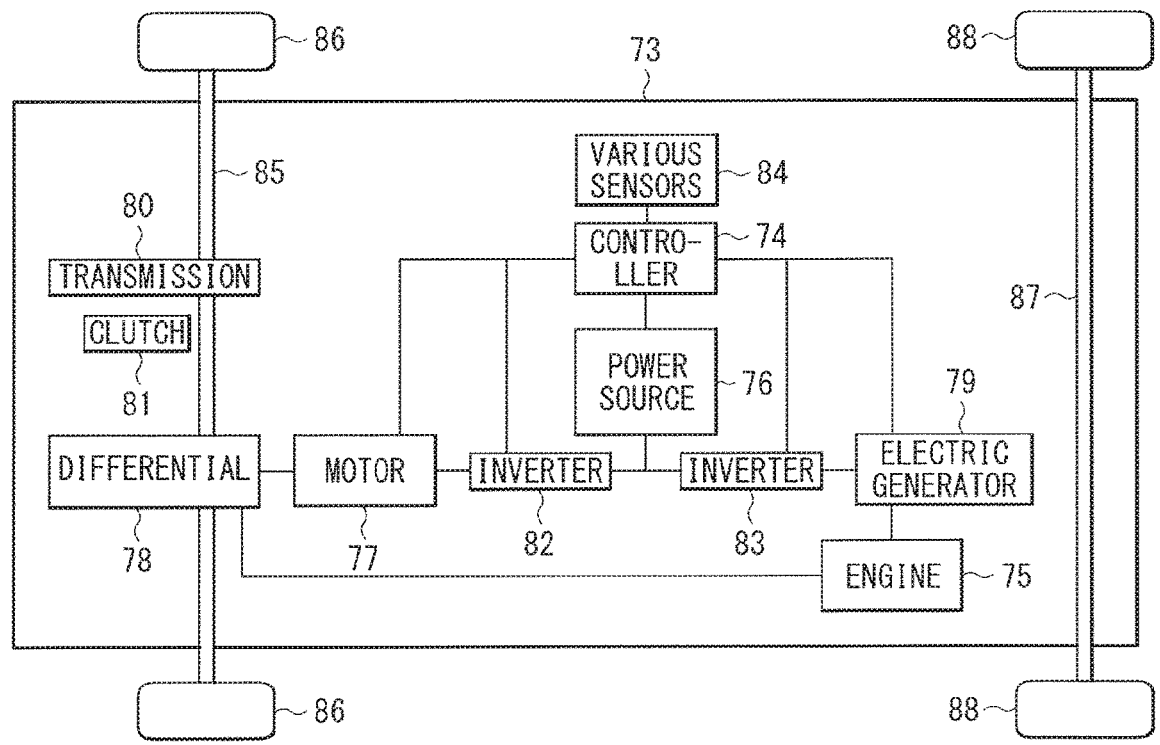

[ FIG. 9 ]
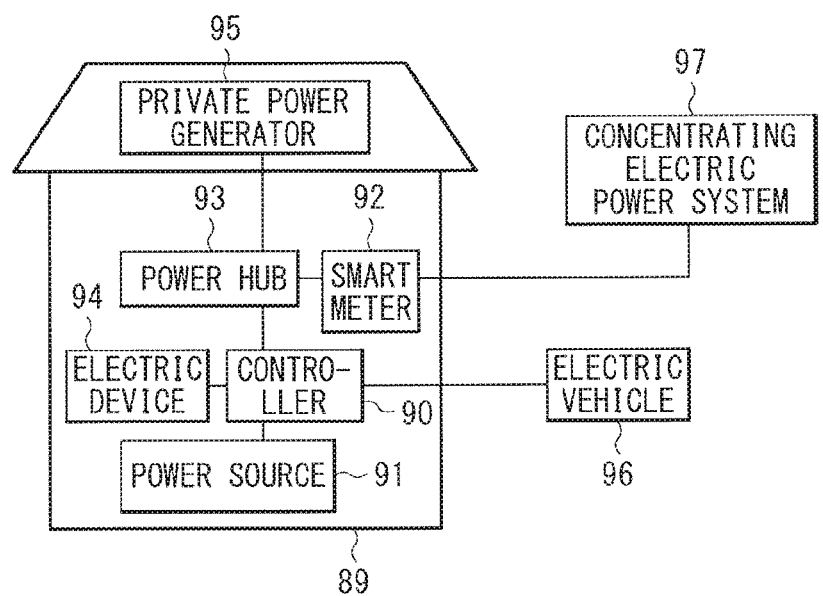
[ FIG. 10 ]
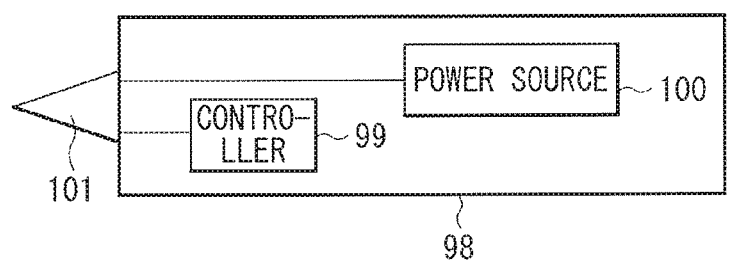

SECONDARY BATTERY-USE ELECTROLYTIC SOLUTION, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS-REFERENCE TO RELATED APPLICATIONS

The present application claims the benefit of International Application No. PCT/JP2015/082214, filed Nov. 17, 2015, which claims priority to Japanese Application No. 2014-253927, filed Dec. 16, 2014, the disclosures of which are incorporated herein by reference.

BACKGROUND

The present technology relates to an electrolytic solution used for a secondary battery, a secondary battery that uses the electrolytic solution, and a battery pack, an electric vehicle, an electric power storage system, an electric power tool, and an electronic apparatus each of which uses the secondary battery.

Various electronic apparatuses such as mobile phones and personal digital assistants (PDAs) have been widely used, and it has been demanded to further reduce size and weight of the electronic apparatuses and to achieve their longer lives. Accordingly, batteries, in particular, small and light-weight secondary batteries that have ability to achieve high energy density have been developed as power sources for the electronic apparatuses.

Applications of the secondary batteries are not limited to the electronic apparatuses described above, and it has been also considered to apply the secondary batteries to various other applications. Examples of such other applications may include: a battery pack attachably and detachably mounted on, for example, an electronic apparatus; an electric vehicle such as an electric automobile; an electric power storage system such as a home electric power server; and an electric power tool such as an electric drill.

There have been proposed secondary batteries that utilize various charge and discharge principles in order to obtain battery capacity. In particular, attention has been paid to a secondary battery that utilizes insertion and extraction of an electrode reactant and a secondary battery that utilizes precipitation and dissolution of an electrode reactant, which make it possible to achieve higher energy density than other batteries such as a lead-acid battery and a nickel-cadmium battery.

The secondary battery includes a cathode, an anode, and electrolytic solution. The electrolytic solution includes a solvent and an electrolyte salt. The composition of the electrolytic solution exerts a large influence on battery characteristics. Accordingly, various studies have been conducted on the composition of the electrolytic solution.

More specifically, in order to stably maintaining capacity for a long time, a cyano borate compound is used as an electrolyte salt (for example, refer to PTL 1). In order to suppress a decline in battery performance over time, a borate compound is used as an electrolyte salt (for example, refer to PTL 2).

CITATION LIST

Patent Literature

PTL 1: Japanese Unexamined Patent Application Publication No. 2014-005261

PTL 2: Japanese Unexamined Patent Application Publication No. 2014-022291

SUMMARY

In association with higher performance and more multi-functionality of electronic apparatuses and other apparatuses described above, the electronic apparatuses and the other apparatuses are more frequently used, and usage environment thereof expands. For this reason, there is still room for improvement in battery characteristics of the secondary batteries.

It is therefore desirable to provide a secondary battery-use electrolytic solution, a secondary battery, a battery pack, an electric vehicle, an electric power storage system, an electric power tool, and an electronic apparatus each of which makes it possible to achieve superior battery characteristics.

A secondary battery-use electrolytic solution according to an embodiment of the present technology includes a cyano compound represented by the following formula (1).

[Chem. 1]

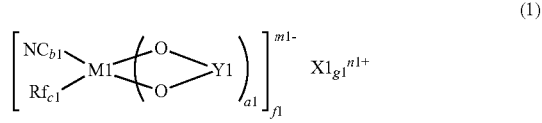

(1)

where $X1^{n1+}$ is one of a metal ion and an onium ion, M1 is one of transition metal elements, and Group 13 elements, Group 14 elements, and Group 15 elements in the long form of the periodic table of the elements, Rf is one of a fluorine group and a monovalent fluorinated hydrocarbon group, Y1 is one of $-C(=O)-(CR1_2)_{d1}-C(=O)-$, $-CR2_2-(CR3_2)_{e1}-C(=O)-$, $-S(=O)_2-(CR3_2)_{e1}-S(=O)_2-$, $-CR2_2-(CR3_2)_{e1}-S(=O)_2-$, $-C(=O)-(CR3_2)_{e1}-S(=O)_2-$, and $-CR2_2-(CR3_2)_{e1}-CR2_2-$, each of R1's is one of a hydrogen group ($-H$), a fluorine group ($-F$), a monovalent hydrocarbon group, and a monovalent fluorinated hydrocarbon group, and one or more of R1's is one of the fluorine group and the monovalent fluorinated hydrocarbon group, each of R2's is one of a hydrogen group, a fluorine group, a monovalent hydrocarbon group, and a monovalent fluorinated hydrocarbon group, each of R3's is one of a hydrogen group, a fluorine group, a monovalent hydrocarbon group, and a monovalent fluorinated hydrocarbon group, each of a1, f1, and n1 is an integer of 1 or 2, each of b1 and d1 is an integer of 1 to 4, c1 is an integer of 0 to 3, e1 is an integer of 0 to 4, and each of g1 and m1 is an integer of 1 to 3.

A secondary battery according to an embodiment of the present technology includes: a cathode; an anode; and an electrolytic solution, and the electrolytic solution has a similar configuration to that of the foregoing secondary battery-use electrolytic solution according to the embodiment of the present technology.

A battery pack, an electric vehicle, an electric power storage system, an electric power tool, and an electronic apparatus according to respective embodiments of the present technology each include a secondary battery, and the secondary battery has a configuration similar to that of the foregoing secondary battery according to the embodiment of the present technology.

According to the secondary battery-use electrolytic solution and the secondary battery of the respective embodiments of the present technology, the electrolytic solution includes the cyano compound represented by the formula (1), which makes it possible to achieve superior battery characteristics. Moreover, in each of the battery pack, the electric vehicle, the electric power storage system, the electric power tool, and the electronic apparatus of the respective embodiments of the present technology, similar effects are achievable.

Note that effects described here are non-limiting. Effects achieved by the present technology may be one or more of effects described in the present technology.

BRIEF DESCRIPTION OF THE DRAWINGS

FIG. 1 is a cross-sectional view of a configuration of a secondary battery (cylindrical type) according to an embodiment of the present technology.

FIG. 2 is a cross-sectional view of part of a spirally wound electrode body illustrated in FIG. 1.

FIG. 3 is a perspective view of a configuration of another secondary battery (laminated film type) according to the embodiment of the present technology.

FIG. 4 is a cross-sectional view taken along a line IV-IV of a spirally wound electrode body illustrated in FIG. 3.

FIG. 5 is a perspective view of a configuration of an application example (a battery pack: single battery) of the secondary battery.

FIG. 6 is a block diagram illustrating a configuration of the battery pack illustrated in FIG. 5.

FIG. 7 is a block diagram illustrating a configuration of an application example (a battery pack: assembled battery) of the secondary battery.

FIG. 8 is a block diagram illustrating a configuration of an application example (an electric vehicle) of the secondary battery.

FIG. 9 is a block diagram illustrating a configuration of an application example (an electric power storage system) of the secondary battery.

FIG. 10 is a block diagram illustrating a configuration of an application example (an electric power tool) of the secondary battery.

DETAILED DESCRIPTION

In the following, some embodiments of the present technology are described in detail with reference to the drawings. It is to be noted that description is given in the following order.

1. Secondary Battery-Use Electrolytic Solution
2. Secondary Battery
2-1. Lithium-Ion Secondary Battery (Cylindrical Type)
2-2. Lithium-Ion Secondary Battery (Laminated Film Type)
2-3. Lithium Metal Secondary Battery
3. Applications of Secondary Battery
3-1. Battery Pack (Single Battery)
3-2. Battery Pack (Assembled Battery)
3-3. Electric Vehicle
3-4. Electric Power Storage System
3-5. Electric Power Tool 1. Secondary Battery-Use Electrolytic Solution>

First, description is given of a secondary battery-use electrolytic solution according to an embodiment of the present technology.

The secondary battery-use electrolytic solution described here (hereinafter simply referred to as "electrolytic solution") may be used for, for example, a secondary battery such as a lithium-ion secondary battery. However, the kind of the secondary battery using the electrolytic solution is not limited to the lithium-ion secondary battery.

[Cyano Compound]

The electrolytic solution includes one or more cyano compounds represented by the following formula (1) (hereinafter simply referred to as "cyano compounds"). The cyano compounds may also serve as, for example, part of an electrolyte salt to be described later in the electrolytic solution.

[Chem. 2]

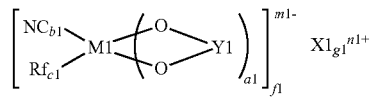

(1)

where $X1^{n1+}$ is one of a metal ion and an onium ion, M1 is one of transition metal elements, and Group 13 elements, Group 14 elements, and Group 15 elements in the long form of the periodic table of the elements, Rf is one of a fluorine group and a monovalent fluorinated hydrocarbon group, Y1 is one of $-C(=O)-(CR1_2)_{d1}-C(=O)-$, $-CR2_2-(CR3_2)_{e1}-C(=O)-$, $-S(=O)_2-(CR3_2)_{e1}-S(=O)_2-$, $-CR2_2-(CR3_2)_{e1}-S(=O)_2-$, $-C(=O)-(CR3_2)_{e1}-S(=O)_2-$, and $-CR2_2-(CR3_2)_{e1}-CR2_2-$, each of R1's is one of a hydrogen group (—H), a fluorine group (—F), a monovalent hydrocarbon group, and a monovalent fluorinated hydrocarbon group, and one or more of R1's is one of the fluorine group and the monovalent fluorinated hydrocarbon group, each of R2's is one of a hydrogen group, a fluorine group, a monovalent hydrocarbon group, and a monovalent fluorinated hydrocarbon group, each of R3's is one of a hydrogen group, a fluorine group, a monovalent hydrocarbon group, and a monovalent fluorinated hydrocarbon group, each of a1, f1, and n1 is an integer of 1 or 2, each of b1 and d1 is an integer of 1 to 4, c1 is an integer of 0 to 3, e1 is an integer of 0 to 4, and each of g1 and m1 is an integer of 1 to 3.

The cyano compound includes a cation ($X1^{n1+}$) and an anion, and in the anion, a cyano group (—CN) is bound to a central element (M1). As can be seen from a range of values that b1 possibly takes (b1=an integer of 1 to 4), the cyano compound includes one or more cyano groups.

The electrolytic solution includes the cyano compound, which improves chemical stability of the electrolytic solution, thereby suppressing decomposition reaction of the electrolytic solution during charge and discharge. In this case, decomposition reaction of the electrolytic solution is suppressed particularly even in a hostile environment such as a high-temperature environment and a low-temperature environment.

The kind of $X1^{n1+}$ is not particularly limited, as long as $X1^{n1+}$ is one of the metal ion and the onium ion. In a case in which the number of $X1^{n1+}$'s (a value of g1) is two or more, the two or more $X1^{n1+}$'s may be ions of a same kind or ions of different kinds. It goes without saying that some of the two or more $X1^{n1+}$'s may be ions of a same kind.

The kind of the metal ion is not particularly limited, as long as the metal ion is any of ions of metal elements. In particular, the metal element may be preferably one of Group 1 elements (alkali metal elements) and Group 2 elements (alkaline-earth metal elements) in the long form of the periodic table of the elements, which easily make the cyano compound available (manufacturable) and sufficiently improve chemical stability of the electrolytic solution.

Examples of the alkali metal elements may include lithium (Li), sodium (Na), potassium (K), rubidium (Rb), cesium (Cs), and francium (Fr). Examples of the alkaline-earth metal elements may include beryllium (Be), magnesium (Mg), calcium (Ca), strontium (Sr), barium (Ba), and radium (Ra).

The kind of the onium ion is not particularly limited, as long as the onium ion is any of cations obtained by protonation. Examples of the onium ion may include an ammonium ion ($NH_4^+$), a phosphonium ion ($PH_4^+$), an oxonium ion ($H_3O^+$), a sulfonium ion ($H_3S^+$), a fluoronium ion ($H_2F^+$), and a chloronium ion ($H_2Cl^+$).

In particular, X1 may be preferably lithium, which makes it possible to achieve a higher effect.

The kind of M1 is not particularly limited, as long as M1 is one of the transition metal elements, and the Group 13 elements, the Group 14 elements, and the Group 15 elements in the long form of the periodic table of the elements.

Examples of the Group 13 elements may include boron (B), aluminum (Al), gallium (Ga), indium (In), and thallium (Tl). Examples of the Group 14 elements may include carbon (C), silicon (Si), germanium (Ge), tin (Sn), and lead (Pb). Examples of the Group 15 elements may include nitrogen (N), phosphorus (P), arsenic (As), antimony (Sb), and bismuth (Bi).

In particular, M1 may be preferably one of elements such as boron, phosphorus, and aluminum, which easily make the cyano compound available (manufacturable) and sufficiently improve chemical stability of the electrolytic solution.

The kind of Rf is not particularly limited, as long as Rf is one of the fluorine group and the monovalent fluorinated hydrocarbon group. In a case in which the number of Rfs (a value of c1) is two or more, the two or more Rfs may be groups of a same kind or groups of different kinds. It goes without saying that some of the two or more Rfs may be groups of a same kind. As can be seen from a range of values that c1 possibly takes (c1=an integer of 0 to 3), the cyano compound may include Rf or may not include Rf.

The monovalent fluorinated hydrocarbon group is a group in which one or more hydrogen groups (—H) in the monovalent hydrocarbon group are substituted by a fluorine group (—F). The monovalent hydrocarbon group is a generic name of a monovalent group configured of carbon (C) and hydrogen (H).

It is to be noted that the monovalent hydrocarbon group may have a straight-chain structure or a branched structure with one or more side chains. Moreover, the monovalent hydrocarbon group may be an unsaturated hydrocarbon group including a carbon-carbon multiple bond or a saturated hydrocarbon group not including a carbon-carbon multiple bond. Examples of the carbon-carbon multiple bond may include a carbon-carbon double bond (>C=C<) and a carbon-carbon triple bond (—C≡C—).

Examples of the monovalent hydrocarbon group may include an alkyl group, an alkenyl group, an alkynyl group, a cycloalkyl group, an aryl group, and a monovalent group in which two or more of the alkyl group, the alkenyl group, the alkynyl group, the cycloalkyl group, and the aryl group are bound (hereinafter referred to as "monovalent binding group"). Examples of the monovalent binding group may include a group in which the alkyl group and the alkenyl group are bound, a group in which the alkyl group and the alkynyl group are bound, and a group in which the alkenyl group and the alkynyl group are bound. Moreover, examples of the monovalent binding group may include a group in which the cycloalkyl group and one of the alkyl group, the alkenyl group, and the alkynyl group are bound, and a group in which the aryl group and one of the alkyl group, the alkenyl group, and the alkynyl group are bound.

It is to be noted that the number of carbons in the monovalent hydrocarbon group is not particularly limited. The number of carbons in the alkyl group may be, for example, from 1 to 10. The number of carbons in the alkenyl group and the number of carbons in the alkynyl group each may be, for example, from 2 to 10. The number of carbons in the cycloalkyl group and the number of carbons in the aryl group each may be, for example, from 6 to 18. This makes it possible to sufficiently improve chemical stability of the electrolytic solution while securing solubility, compatibility, and other properties of the cyano compound.

Specific examples of the alkyl group may include a methyl group (—$CH_3$), an ethyl group (—$C_2H_5$), a propyl group (—$C_3H_7$), and a t-butyl group (—C(—$CH_3$)$_2$—$CH_3$). Specific examples of the alkenyl group may include a vinyl group (—CH=$CH_2$) and an allyl group (—$CH_2$—CH=$CH_2$). Specific examples of the alkynyl group may include an ethynyl group (—C≡CH). Specific examples of the cycloalkyl group may include a cyclopropyl group, a cyclobutyl group, a cyclopentyl group, a cyclohexyl group, a cycloheptyl group, and a cyclooctyl group. Specific examples of the aryl group may include a phenyl group and a naphthyl group. Specific examples of the monovalent binding group may include a benzyl group.

In particular, Rf may be preferably a monovalent fluorinated hydrocarbon group, and more preferably a fluorinated alkyl group. Moreover, the number of carbons in the monovalent fluorinated hydrocarbon group may be preferably from 1 to 10, as described above, which sufficiently improves chemical stability of the electrolytic solution while securing solubility, compatibility, and other properties of the cyano compound.

Specific examples of the monovalent fluorinated hydrocarbon group may be a group in which one or more hydrogen groups in each of the specific examples of the alkyl group, the specific examples of the alkenyl group, the specific examples of the alkynyl group, the specific examples of the cycloalkyl group, the specific examples of the aryl group, the specific examples of the monovalent binding group mentioned above are substituted by a fluorine group.

Specific examples of the monovalent fluorinated alkyl group may include a perfluoromethyl group (—$CF_3$), a perfluoroethyl group (—$C_2F_5$), a perfluoropropyl group (—$C_3F_7$), and a perfluoro-t-butyl group (—C(—$CF_3$)$_2$—$CF_3$).

The kind of Y1 is not particularly limited, as long as Y1 is one of six kinds of divalent groups mentioned above.

The group "—C(=O)—($CR1_2$)$_{d1}$-C(=O)—" is a group including two carbonyl groups (—(C=O)—). The group "—$CR2_2$-($CR3_2$)$_{e1}$-C(=O)—" is a group including one carbonyl group. The group "—S(=O)$_2$—($CR3_2$)$_{e1}$-S(=O)$_2$—" is a group including two sulfonyl groups (—S(=O)$_2$—). The group "—$CR2_2$-($CR3_2$)$_{e1}$-S(=O)$_2$—" is a group including one sulfonyl group. The group "—C(=O)—($CR3_2$)$_{e1}$-S(=O)$_2$—" is a group including one carbonyl group and one sulfonyl group. The group "—$R2_2$C—($CR3_2$)$_{e1}$-$CR2_2$-" is a group including neither a carbonyl group nor a sulfonyl group.

The kind of each of R1's is not particularly limited, as long as each of R1's is one of the hydrogen group, the fluorine group, the monovalent hydrocarbon group, and the monovalent fluorinated hydrocarbon group. Details of the monovalent hydrocarbon group and the monovalent fluorinated hydrocarbon group are as described above.

Note that one or more of R1's may be one of the fluorine group and the monovalent fluorinated hydrocarbon group. In other words, in a case in which Y1 is —C(=O)—(CR1$_2$)$_{d1}$-C(=O)—, one or more of R1's may include fluorine (F) as a constituent element, which improves chemical stability of the electrolytic solution, as compared with a case in which one or more of R1's do not include fluorine as a constituent element.

In a case in which Y1 is —C(=O)—(CR1$_2$)$_{d1}$-C(=O)—, specific examples of Y1 may include —C(=O)—(CF$_2$)—C(=O)—, —C(=O)—(CFH)—C(=O)—, and —C(=O)—(C$_2$F$_4$)—C(=O)—.

The kinds of each of R2's is not particularly limited, as long as each of R2's is one of the hydrogen group, the fluorine group, the monovalent hydrocarbon group, and the monovalent fluorinated hydrocarbon group. In other words, unlike R1's mentioned above, one or more of R2's may include fluorine as a constituent element or may not include fluorine as a constituent element.

The above description of R2's applies to R3's. In other words, the kind of each of R3's is not particularly limited, as long as each of R3's is one of the hydrogen group, the fluorine group, the monovalent hydrocarbon group, and the monovalent fluorinated hydrocarbon group. Moreover, one or more of R3's may include fluorine as a constituent element, or may not include fluorine as a constituent element.

Specific examples of the cyano compound may include the following compounds.

Specific examples of the cyano compound in which Y1 is —C(=O)—(CR1$_2$)$_{d1}$-C(=O)— may include compounds represented by the following formulas (1-1) to (1-18).

[Chem. 3]

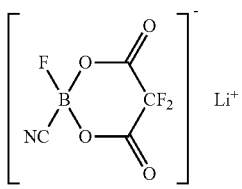
(1-1)

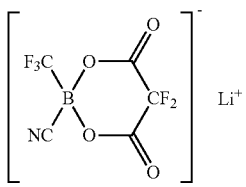
(1-2)

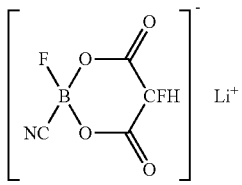
(1-3)

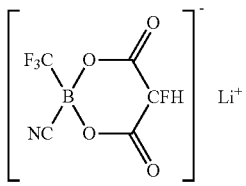
(1-4)

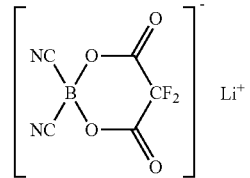
(1-5)

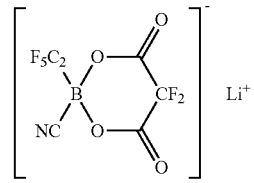
(1-6)

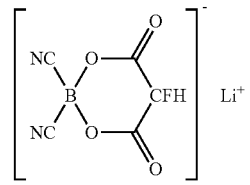
(1-7)

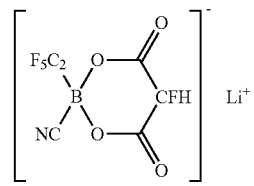
(1-8)

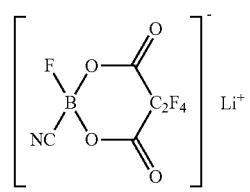
(1-9)

[Chem. 4]

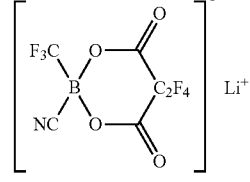
(1-10)

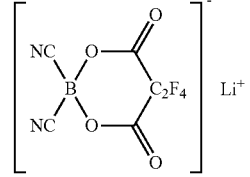
(1-11)

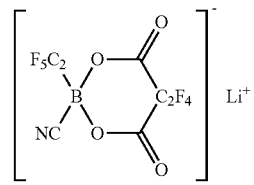
(1-12)

(1-13) 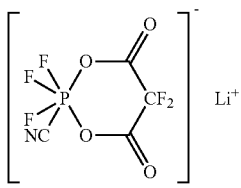
(1-14) 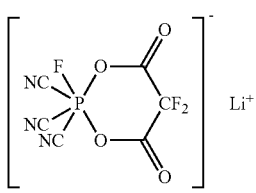
(1-15) 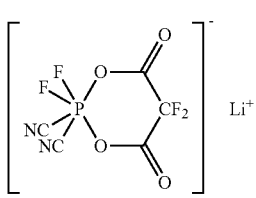
(1-16) 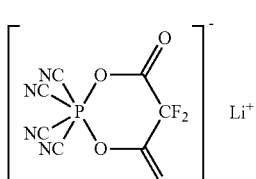
(1-17) 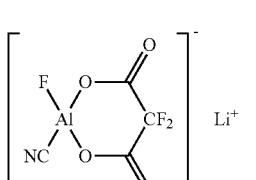
(1-18) 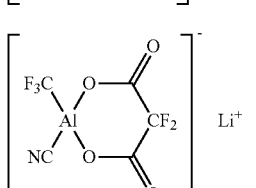
Specific examples of the cyano compound in which Y1 is —CR2$_2$-(CR3$_2$)$_{e1}$-C(=O)— may include compounds represented by the following formulas (1-21) to (1-36).
[Chem. 5]
(1-21) 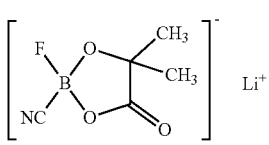
(1-22) 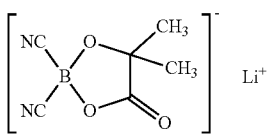
(1-23) 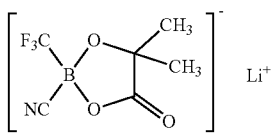
(1-24) 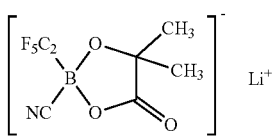
(1-25) 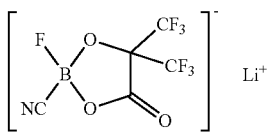
(1-26) 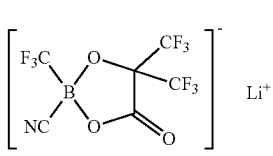
(1-27) 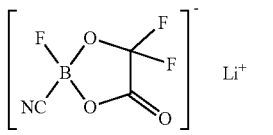
(1-28) 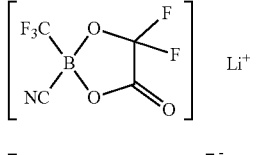
(1-29) 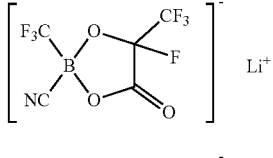
(1-30) 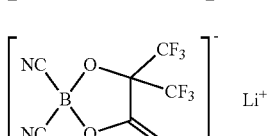
(1-31) 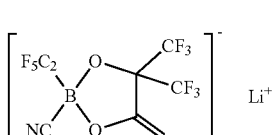
(1-32) 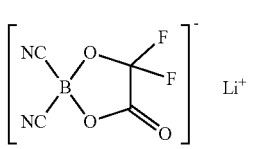
[Chem. 6]
(1-33)

-continued

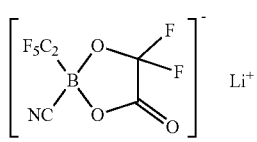 (1-34)

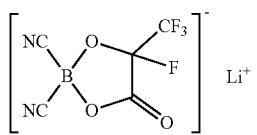 (1-35)

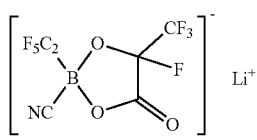 (1-36)

Specific examples of the cyano compound in which Y1 is —S(=O)$_2$—(CR3$_2$)$_{e1}$-S(=O)$_2$— may include compounds represented by the following formulas (1-41) to (1-44).

[Chem. 7]

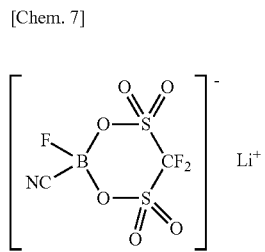 (1-41)

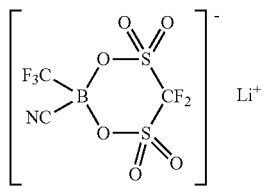 (1-42)

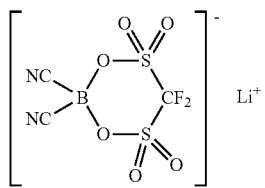 (1-43)

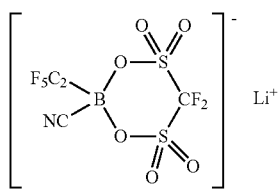 (1-44)

Specific examples of the cyano compound in which Y1 is —CR2$_2$-(CR3$_2$)$_{e1}$-S(=O)$_2$— may include compounds represented by the following formulas (1-51) to (1-56).

[Chem. 8]

(1-51)

(1-52)

(1-53)

(1-54)

(1-55)

(1-56)

Specific examples of the cyano compound in which Y1 is —C(=O)—(CR3$_2$)$_{e1}$-S(=O)$_2$— may include compounds represented by the following formulas (1-61) to (1-64).

[Chem. 9]

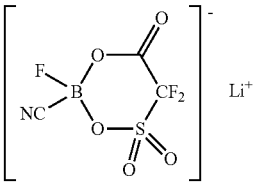 (1-61)

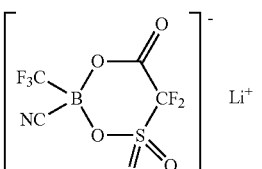 (1-62)

(1-63)
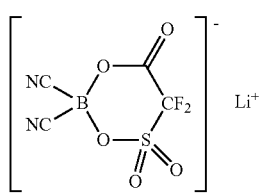

(1-64)
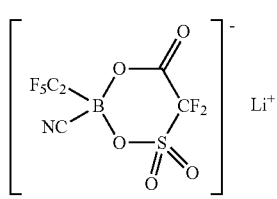

Specific examples of the cyano compound in which Y1 is —CR2$_2$-(CR3$_2$)$_{e1}$-CR2$_2$- may include compounds represented by the following formulas (1-71) to (1-74).

[Chem. 10]

(1-71)
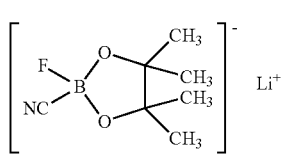

(1-72)
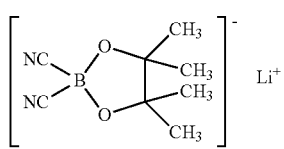

(1-73)
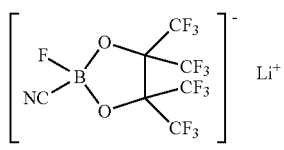

(1-74)
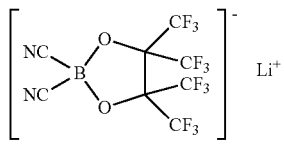

A content of the cyano compound in the electrolytic solution is not particularly limited. In particular, the content of the cyano compound in the electrolytic solution may be preferably from 0.01 mol/kg to 1.5 mol/kg both inclusive, and more preferably from 0.01 mol/kg to 0.5 mol/kg both inclusive, which sufficiently improves chemical stability of the electrolytic solution.

[Other Materials]

It is to be noted that the electrolytic solution may include one or more other materials in addition to the foregoing cyano compound.

[Solvent]

The other materials may be, for example, one or more of solvents such as a nonaqueous solvent (an organic solvent). An electrolytic solution including the nonaqueous solvent is a so-called nonaqueous electrolytic solution.

Examples of the solvents may include a cyclic carbonate ester, a chain carbonate ester, a lactone, a chain carboxylate ester, and a nitrile (mononitrile), which make it possible to achieve, for example, high battery capacity, superior cycle characteristics, and superior storage characteristics.

Examples of the cyclic carbonate ester may include ethylene carbonate, propylene carbonate, and butylene carbonate. Examples of the chain carbonate ester may include dimethyl carbonate, diethyl carbonate, ethylmethyl carbonate, and methylpropyl carbonate. Examples of the lactone may include γ-butyrolactone and γ-valerolactone. Examples of the chain carboxylate ester may include methyl acetate, ethyl acetate, methyl propionate, ethyl propionate, propyl propionate, methyl butyrate, methyl isobutyrate, methyl trimethylacetate, and ethyl trimethylacetate. Examples of the nitrile may include acetonitrile, methoxyacetonitrile, and 3-methoxypropionitrile.

In addition, examples of the solvents may include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyl oxazolidinone, N,N'-dimethyl imidazolidinone, nitromethane, nitroethane, sulfolane, trimethyl phosphate, and dimethyl sulfoxide, which make it possible to achieve a similar advantage.

In particular, one or more of ethylene carbonate, propylene carbonate, dimethyl carbonate, diethyl carbonate, and ethylmethyl carbonate may be preferable, which make it possible to achieve, for example, higher battery capacity, superior cycle characteristics, and superior storage characteristics. In this case, a combination of a high-viscosity (high dielectric constant) solvent (having, for example, specific dielectric constant ε≥30) such as ethylene carbonate and propylene carbonate and a low-viscosity solvent (having, for example, viscosity≤1 mPa·s) such as dimethyl carbonate, ethylmethyl carbonate, and diethyl carbonate may be more preferable. The combination allows for an improvement in the dissociation property of an electrolyte salt and ion mobility.

In particular, the solvent may contain one or more of an unsaturated cyclic carbonate ester, a halogenated carbonate ester, a sulfonate ester, an acid anhydride, a dicyano compound (dinitrile), and a diisocyanate compound, which make it possible to improve chemical stability of the electrolytic solution.

The unsaturated cyclic carbonate ester is a cyclic carbonate ester having one or more unsaturated bonds (carbon-carbon double bonds). Examples of the unsaturated cyclic carbonate ester may include compounds represented by the following formulas (2) to (4). A content of the unsaturated cyclic carbonate ester in the solvent is not particularly limited, but, may be, for example, from 0.01 wt % to 10 wt % both inclusive.

[Chem. 11]

(2)
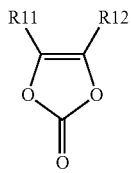

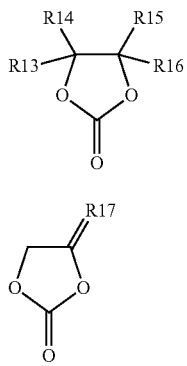

(3)

(4)

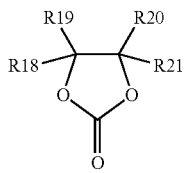

(5)

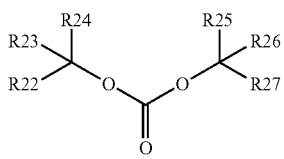

(6)

where each of R11 and R12 is one of a hydrogen group and an alkyl group, each of R13 to R16 is one of a hydrogen group, an alkyl group, a vinyl group, and an allyl group, one or more of R13 to R16 is one of the vinyl group and the allyl group, R17 is a group represented by >CR171R172, and each of R171 and R172 is one of a hydrogen group and an alkyl group.

The compound represented by the formula (2) is a vinylene carbonate-based compound. R11 and R12 may be groups of a same kind or groups of different kinds. Details of the alkyl group are as described above. Specific examples of the vinylene carbonate-based compound may include vinylene carbonate (1,3-dioxol-2-one), methylvinylene carbonate (4-methyl-1,3-dioxol-2-one), ethylvinylene carbonate (4-ethyl-1,3-dioxol-2-one), 4,5-dimethyl-1,3-dioxol-2-one, 4,5-diethyl-1,3-dioxol-2-one, 4-fluoro-1,3-dioxol-2-one, and 4-trifluoromethyl-1,3-dioxol-2-one.

The compound represented by the formula (3) is a vinyl ethylene carbonate-based compound. R13 to R16 may be groups of a same kind or groups of different kinds. It goes without saying that some of R13 to R16 may be groups of a same kind. Specific examples of the vinyl ethylene carbonate-based compound may include vinyl ethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, and 4,5-divinyl-1,3-dioxolane-2-one.

The compound represented by the formula (4) is a methylene ethylene carbonate-based compound. R171 and R172 may be groups of a same kind or groups of different kinds. Specific examples of the methylene ethylene carbonate-based compound may include methylene ethylene carbonate (4-methylene-1,3-dioxolane-2-one), 4,4-dimethyl-5-methylene-1,3-dioxolane-2-one, and 4,4-diethyl-5-methylene-1,3-dioxolane-2-one.

In addition, the unsaturated cyclic carbonate ester may be a catechol carbonate having a benzene ring.

The halogenated carbonate ester is a cyclic or chain carbonate ester containing one or more halogens as constituent elements, and is a compound represented by one of the following formulas (5) and (6). A content of the halogenated carbonate ester in the solvent is not particularly limited, but may be, for example, from 0.01 wt % to 50 wt % both inclusive.

where each of R18 to R21 is one of a hydrogen group, a halogen group, an alkyl group, and a halogenated alkyl group, one or more of R18 to R21 is one of the halogen group and the halogenated alkyl group, each of R22 to R27 is one of a hydrogen group, a halogen group, an alkyl group, and a halogenated alkyl group, and one or more of R22 to R27 is one of the halogen group and the halogenated alkyl group.

The compound represented by the formula (5) is a cyclic halogenated carbonate ester. R18 to R21 may be groups of a same kind or groups of different kinds. It goes without saying that some of R18 to R21 may be groups of a same kind.

The kind of the halogen group is not particularly limited; however, in particular, one or more of a fluorine group (—F), a chlorine group (—Cl), a bromine group (—Br) and a iodine group (—I) may be preferable, and the fluorine group may be more preferable. The fluorine group makes it possible to easily form the foregoing protective film, as compared with other halogen groups. It is to be noted that the number of halogen groups may be more preferably two than one, and may be three or more. This makes it possible to achieve a higher effect.

Details of the alkyl group are as described above. The halogenated alkyl group is a group in which one or more hydrogen groups in an alkyl group are substituted (halogenated) by a halogen group.

Specific examples of the cyclic halogenated carbonate ester may include compounds represented by the following formulas (5-1) to (5-21), which include geometric isomers. In particular, for example, 4-fluoro-1,3-dioxolane-2-one represented by the formula (5-1) and 4,5-difluoro-1,3-dioxolane-2-one represented by the formula (5-3) may be preferable. It is to be noted that as 4,5-difluoro-1,3-dioxolane-2-one, a trans-isomer may be more preferable than a cis-isomer, which is easily available and makes it possible to achieve a higher effect.

[Chem. 13]

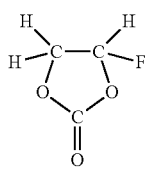

(5-1)

(5-2)
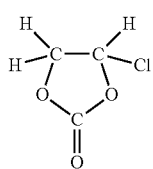
(5-3)
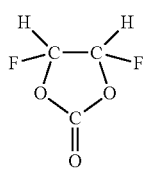
(5-4)
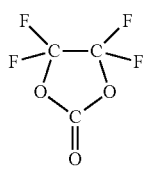
(5-5)
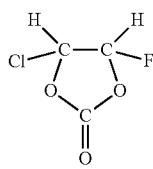
(5-6)
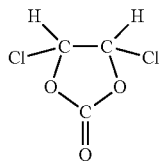
(5-7)
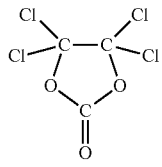
(5-8)
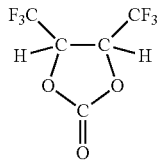
(5-9)
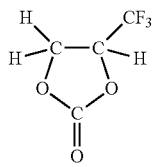
(5-10)
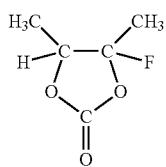
(5-11)
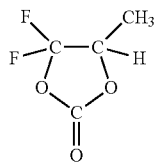
(5-12)
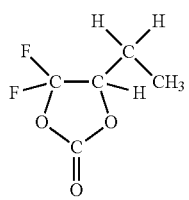
(5-13)
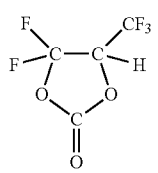
(5-14)
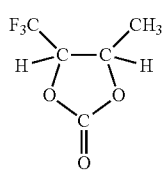
(5-15)
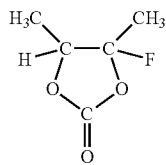
(5-16)
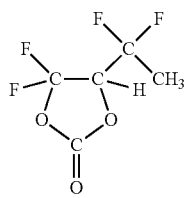
(5-17)
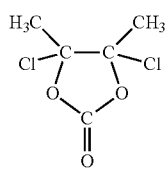
(5-18)
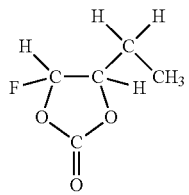

(5-19)
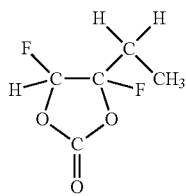

(5-20)
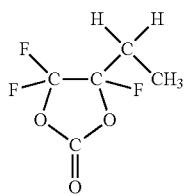

(5-21)
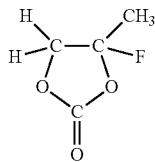

The compound represented by the formula (8) is a halogenated chain carbonate ester. R22 to R27 may be groups of a same kind or groups of different kinds. It goes without saying that some of R22 to R27 may be groups of a same kind.

Specific examples of the halogenated chain carbonate ester may include fluoromethyl methyl carbonate, bis(fluoromethyl) carbonate, and difluoromethyl methyl carbonate.

Examples of the sulfonate ester may include a monosulfonate ester and a disulfonate ester. A content of the sulfonate ester in the solvent is not particularly limited, but may be, for example, from 0.5 wt % to 5 wt % both inclusive.

The monosulfonate ester may be a cyclic monosulfonate ester or a chain monosulfonate ester. Specific examples of the cyclic monosulfonate ester may include sultone such as 1,3-propane sultone and 1,3-propene sultone. Specific examples of the chain monosulfonate ester may include a compound in which a cyclic monosulfonate ester is cleaved at a middle site.

The disulfonate ester may be a cyclic disulfonate ester or a chain disulfonate ester. Specific examples of the cyclic disulfonate ester may include compounds represented by formulas (7-1) to (7-3). Specific examples of the chain disulfonate ester may include a compound in which a cyclic disulfonate ester is cleaved at a middle site.

[Chem. 14]

(7-1)
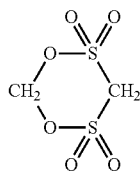

(7-2)
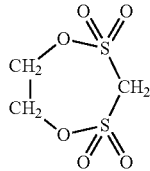

(7-3)
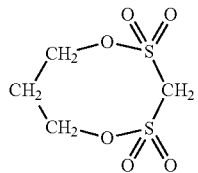

Examples of the acid anhydride may include a carboxylic anhydride, a disulfonic anhydride, and a carboxylic-sulfonic anhydride. A content of the acid anhydride in the solvent is not particularly limited, but may be, for example, from 0.5 wt % to 5 wt % both inclusive.

Specific examples of the carboxylic anhydride may include succinic anhydride, glutaric anhydride, and maleic anhydride. Specific examples of the disulfonic anhydride may include ethanedisulfonic anhydride and propanedisulfonic anhydride. Specific examples of a carboxylic-sulfonic anhydride may include sulfobenzoic anhydride, sulfopropionic anhydride, and sulfobutyric anhydride.

Examples of the dicyano compound may include a compound represented by NC—$C_mH_{2m}$—CN (where m is an integer of 1 or more). A content of the dicyano compound in the solvent is not particularly limited, but may be, for example, from 0.5 wt % to 5 wt % both inclusive. Specific examples of the dicyano compound may include succinonitrile (NC—$C_2H_4$—CN), glutaronitrile (NC—$C_3H_6$—CN), adiponitrile (NC—$C_4H_8$—CN), and phthalonitrile (NC—$C_6H_4$—CN).

Examples of the diisocyanate compound may include a compound represented by OCN—$C_nH_{2n}$—NCO (where n is an integer of 1 or more). A content of the diisocyanate compound in the solvent is not particularly limited, but may be, for example, from 0.5 wt % to 5 wt % both inclusive. Specific examples of the diisocyanate compound may include OCN—$C_6H_{12}$—NCO.

[Electrolyte Salt]

Moreover, the other materials may be, for example, one or more of electrolyte salts such as a lithium salt. However, the electrolyte salt may contain a salt other than the lithium salt. Examples of the salt other than the lithium salt may include a light metal salt other than the lithium salt.

Specific examples of the lithium salt may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr).

In particular, one or more of lithium hexafluorophosphate, lithium tetrafluoroborate, lithium perchlorate, and lithium hexafluoroarsenate may be preferable, and lithium hexafluorophosphate may be more preferable. These lithium salts make it possible to decrease internal resistance.

In addition, the electrolyte salt may be one or more of compounds represented by respective formulas (8) to (10).

It is to be noted that R41 and R43 may be groups of a same kind or groups of different kinds. R51 to R53 may be groups of a same kind or groups of different kinds. It goes without saying that some of R51 to R53 may be groups of a same kind. R61 and R62 may be groups of a same kind or groups of different kinds.

[Chem. 15]

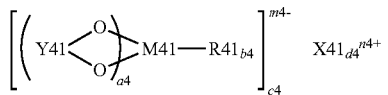
(8)

where X41 is one of Group 1 elements and Group 2 elements in the long form of the periodic table of the elements and aluminum (Al), M41 is one of transition metals, and Group 13 elements, Group 14 elements, and Group 15 elements in the long form of the periodic table of the elements, R41 is a halogen group, Y41 is one of —C(=O)—R42-C(=O)—, —C(=O)—CR432-, and —C(=O)—C(=O)—, R42 is one of an alkylene group, a halogenated alkylene group, an arylene group, and a halogenated arylene group, R43 is one of an alkyl group, a halogenated alkyl group, an aryl group, and a halogenated aryl group, a4 is an integer of 1 to 4, b4 is an integer of 0, 2, or 4, and each of c4, d4, m4, and n4 is an integer of 1 to 3.

[Chem. 16]

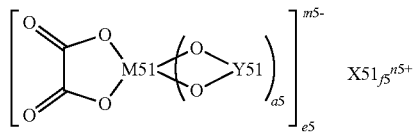
(9)

where X51 is one of Group 1 elements and Group 2 elements in the long form of the periodic table of the elements, M51 is one of transition metals, and Group 13 elements, Group 14 elements, and Group 15 elements in the long form of the periodic table of the elements, Y51 is one of —C(=O)—(CR51$_2$)$_{b5}$-C(=O)—, —R53$_2$C—(CR52$_2$)$_{c5}$-C(=O)—, —R53$_2$C—(CR52$_2$)$_{c5}$-CR53$_2$-, —R53$_2$C—(CR52$_2$)$_{d5}$-S(=O)$_2$—, —S(=O)$_2$—(CR52$_2$)$_{d5}$-S(=O)$_2$—, and —C(=O)—(CR52$_2$)$_{d5}$-S(=O)$_2$—, each of R51 and R53 is one of a hydrogen group, an alkyl group, a halogen group, and a halogenated alkyl group, one or more of R51's are one of the halogen group and the halogenated alkyl group, one or more of R53's are one of the halogen group and the halogenated alkyl group, R52 is one of a hydrogen group, an alkyl group, a halogen group, and a halogenated alkyl group, each of a5, e5, and n5 is an integer of 1 or 2, each of b5 and d5 is an integer of 1 to 4, c5 is an integer of 0 to 4, and each of f5 and m5 is an integer of 1 to 3.

[Chem. 17]

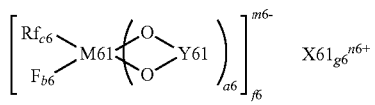
(10)

where X61 is one of Group 1 elements and Group 2 elements in the long form of the periodic table of the elements, M61 is one of transition metals, and Group 13 elements, Group 14 elements, and Group 15 elements in the long form of the periodic table of the elements, Rf is one of a fluorinated alkyl group and a fluorinated aryl group, the number of carbons in each of the fluorinated alkyl group and the fluorinated aryl group is from 1 to 10, Y61 is one of —C(=O)—(CR61$_2$)$_{d6}$-C(=O)—, —R62$_2$C—(CR61$_2$)$_{d6}$-C(=O)—, —R62$_2$C—(CR61$_2$)$_{d6}$-CR62$_2$-, —R62$_2$C—(CR61$_2$)$_{d6}$-S(=O)$_2$—, —S(=O)$_2$—(CR61$_2$)$_{e6}$-S(=O)$_2$—, and —C(=O)—(CR61$_2$)$_{e6}$-S(=O)$_2$—, R61 is one of a hydrogen group, an alkyl group, a halogen group, and a halogenated alkyl group, R62 is one of a hydrogen group, an alkyl group, a halogen group, and a halogenated alkyl group, one or more of R62's are one of the halogen group and the halogenated alkyl group, each of a6, f6, and n6 is an integer of 1 or 2, each of b6, c6, and e6 is an integer of 1 to 4, d6 is an integer of 0 to 4, and each of g6 and m6 is an integer of 1 to 3.

It is to be noted that the Group 1 elements include hydrogen (H), lithium (Li), sodium (Na), potassium (K), rubidium (Rb), cesium (Cs), and francium (Fr). The Group 2 elements include beryllium (Be), magnesium (Mg), calcium (Ca), strontium (Sr), barium (Ba), and radium (Ra). The Group 13 elements include boron (B), aluminum (Al), gallium (Ga), indium (In), and thallium (Tl). The Group 14 elements include carbon (C), silicon (Si), germanium (Ge), tin (Sn), and lead (Pb). The Group 15 elements include nitrogen (N), phosphorus (P), arsenic (As), antimony (Sb), and bismuth (Bi).

Specific examples of the compound represented by the formula (8) may include compounds represented by respective formulas (8-1) to (8-6). Specific examples of the compound represented by the formula (9) may include compounds represented by respective formulas (9-1) to (9-8). Specific examples of the compound represented by the formula (10) may include a compound represented by a formula

[Chem. 18]

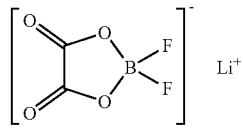
(8-1)

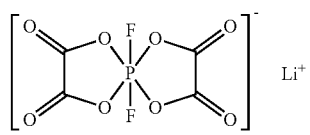
(8-2)

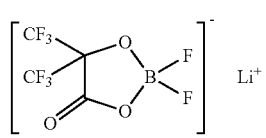
(8-3)

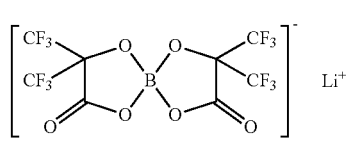
(8-4)

-continued (8-5) 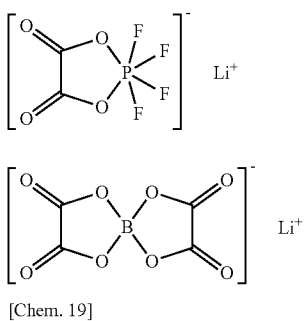

[Chem. 19]

(9-1) 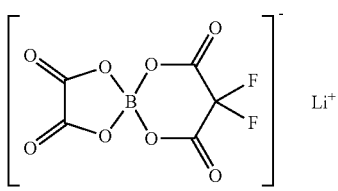

(9-2) 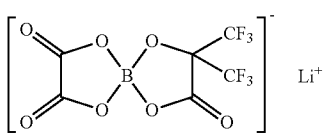

(9-3) 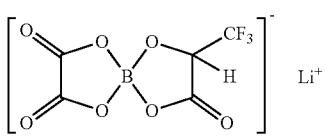

(9-4) 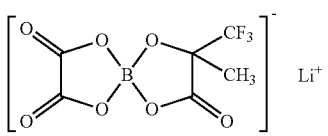

(9-5) 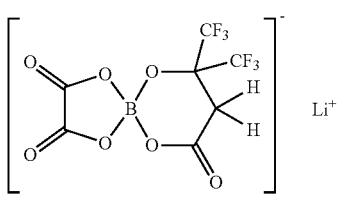

(9-6) 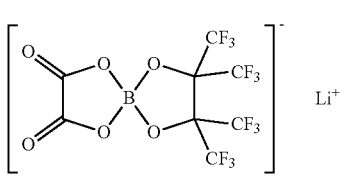

(9-7) 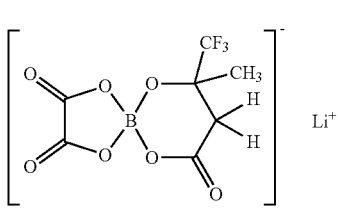

(8-6) 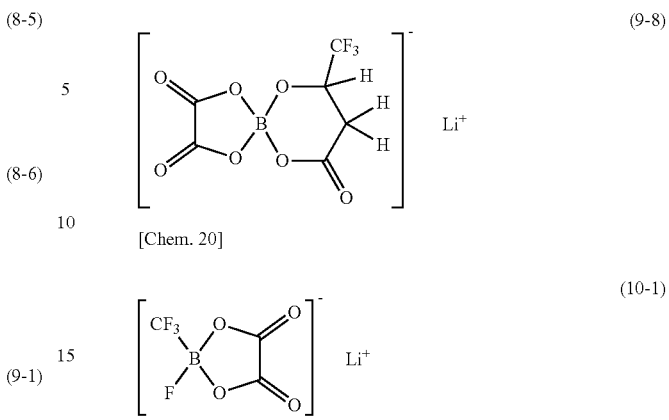

(9-8)

[Chem. 20]

(10-1)

Moreover, the electrolyte salt may be one or more of compounds represented by the following formulas (11) to (13). Values of m and n may be the same as or different from each other. Values of p, q, and r may be the same as or different from one another. It goes without saying that the values of two of p, q, and r may be the same as each other.

$$\text{LiN}(C_mF_{2m+1}SO_2)(C_nF_{2n+1}SO_2) \qquad (11)$$

where each of m and n is an integer of 1 or more.

[Chem. 21]

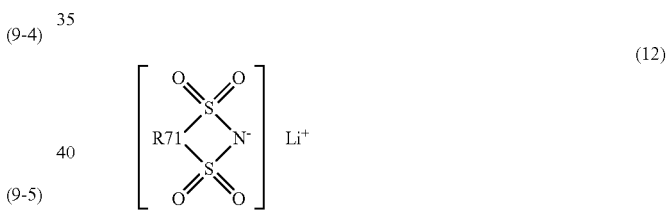

(12)

where R71 is a straight-chain or branched perfluoroalkylene group having 2 to 6 carbons.

$$\text{LiC}(C_pF_{2p+1}SO_2)(C_qF_{2q+1}SO_2)(C_rF_{2r+1}SO_2) \qquad (13)$$

where each of p, q, and r is an integer of 1 or more.

The compound represented by the formula (11) is a chain imide compound. Specific examples of the chain imide compound may include lithium bis(fluorosulfonyl)imide (LiN(SO$_2$F)$_2$), lithium bis(trifluoromethane-sulfonyl)imide (LiN(CF$_3$SO$_2$)$_2$), lithium bis(pentafluoroethanesulfonyl)imide (LiN(C$_2$F$_5$SO$_2$)$_2$), lithium (trifluoromethanesulfonyl)(pentafluoroethanesulfonyl)imide (LiN(CF$_3$SO$_2$)(C$_2$F$_5$SO$_2$)), lithium (trifluoromethanesulfonyl)(heptafluoropropanesulfonyl)imide (LiN(CF$_3$SO$_2$)(C$_3$F$_7$SO$_2$)), and lithium (trifluoromethanesulfonyl)(nonafluorobutanesulfonyl)imide (LiN(CF$_3$SO$_2$)(C$_4$F$_9$SO$_2$)).

The compound represented by the formula (12) is a cyclic imide compound. Specific examples of the cyclic imide compound may include compounds represented by respective formulas (12-1) to (12-4).

[Chem. 22]

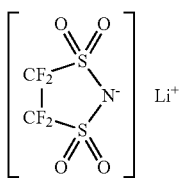
(12-1)

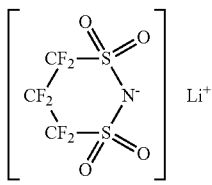
(12-2)

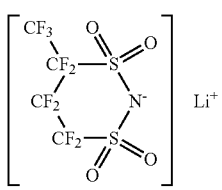
(12-3)

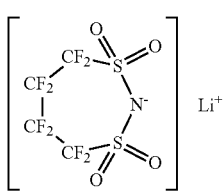
(12-4)

The compound represented by the formula (13) is a chain methide compound. Specific examples of the chain methide compound may include lithium tris(trifluoromethanesulfonyl)methide (LiC(CF$_3$SO$_2$)$_3$).

A content of the electrolyte salt is not particularly limited; however, in particular, the content of the electrolyte salt may be preferably within a range of 0.3 mol/kg to 3.0 mol/kg both inclusive with respect to the solvent. This makes it possible to achieve high ionic conductivity.

[Others]

Moreover, the other materials may be one or more of materials other than the materials mentioned above. Examples of the materials other than the materials mentioned above may include a phosphorus-fluorine-containing salt such as lithium difluorophosphate (LiPF$_2$O$_2$) and lithium fluorophosphate (Li$_2$PFO$_3$). A content of the phosphorus-fluorine-containing salt in the electrolytic solution is not particularly limited.

[Action and Effects of Electrolytic Solution]

The electrolytic solution includes the foregoing cyano compound. In this case, as compared with a case in which the electrolytic solution does not include the cyano compound and a case in which the electrolytic solution includes any other compound, chemical stability of the electrolytic solution is improved, as described above, thereby suppressing decomposition reaction of the electrolytic solution during charge and discharge. Accordingly, in a secondary battery using the electrolytic solution, it is possible to improve battery characteristics.

It is to be noted that examples of the foregoing "other compound" may include compounds represented by the following formulas (14-1) and (14-2). In the compound represented by the formula (14-1), one or more of R1's in —C(=O)—(CR1$_2$)$_{d1}$-C(=O)— that is Y1 do not contain fluorine as a constituent element. The compound represented by the formula (14-2) does not contain —C(=O)—(CR1$_2$)$_{d1}$-C(=O)— (d1≥1) as Y1.

[Chem. 23]

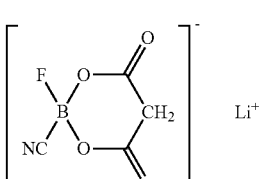
(14-1)

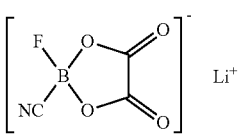
(14-2)

In particular, X1 in the formula (1) is one of the alkali metal element and the alkaline-earth metal element, and in particular, X1 is lithium, which makes it possible to achieve a higher effect.

Moreover, M1 in the formula (1) is one of boron, phosphorus, and aluminum, which makes it possible to achieve a higher effect.

Further, Rf in the formula (1) is a monovalent fluorinated hydrocarbon group, and in particular, Rf is a fluorinated alkyl group, which makes it possible to achieve a higher effect. In this case, the number of carbons in the monovalent fluorinated hydrocarbon group is from 1 to 10, which makes it possible to achieve a still higher effect.

Furthermore, the content of the cyano compound in the electrolytic solution is from 0.01 mol/kg to 0.5 mol/kg both inclusive, which makes it possible to achieve a higher effect.

<2. Secondary Battery>

Next, description is given of a secondary battery using the foregoing electrolytic solution of the present technology.

<2-1. Lithium-Ion Secondary Battery (Cylindrical Type)>

FIG. 1 illustrates a cross-sectional configuration of a secondary battery. FIG. 2 illustrates a cross-sectional configuration of part of a spirally wound electrode body 20 illustrated in FIG. 1.

The secondary battery described here may be, for example, a lithium-ion secondary battery in which a capacity of an anode 22 is obtained by insertion and extraction of lithium as an electrode reactant.

[Whole Configuration of Secondary Battery]

The secondary battery has a so-called cylindrical type battery configuration. The secondary battery may contain, for example, a pair of insulating plates 12 and 13 and the spirally wound electrode body 20 as a battery element inside a battery can 11 having a substantially hollow cylindrical shape, as illustrated in FIG. 1. In the spirally wound electrode body 20, for example, a cathode 21 and the anode 22 may be stacked with a separator 23 in between, and the cathode 21, the anode 22, and the separator 23 may be spirally wound. The spirally wound electrode body 20 may be impregnated with, for example, an electrolytic solution that is a liquid electrolyte.

The battery can 11 may have, for example, a hollow structure in which one end of the battery can 11 is closed and the other end of the battery can 11 is open. The battery can 11 may be made of one or more of, for example, iron (Fe), aluminum (Al), and an alloy thereof. A surface of the battery can 11 may be plated with, for example, nickel. The pair of insulating plates 12 and 13 may be so disposed as to sandwich the spirally wound electrode body 20 in between and extend perpendicularly to a spirally wound periphery surface of the spirally wound electrode body 20.

At the open end of the battery can 11, a battery cover 14, a safety valve mechanism 15, and a positive temperature coefficient device (PTC device) 16 may be swaged with a gasket 17, by which the battery can 11 is hermetically sealed. The battery cover 14 may be made of, for example, a material similar to the material of the battery can 11. Each of the safety valve mechanism 15 and the PTC device 16 may be provided on the inner side of the battery cover 14, and the safety valve mechanism 15 may be electrically coupled to the battery cover 14 via the PTC device 16. In the safety valve mechanism 15, when an internal pressure of the battery can 11 reaches a certain level or higher as a result of, for example, internal short circuit or heating from outside, a disk plate 15A inverts. This cuts electric connection between the battery cover 14 and the spirally wound electrode body 20. In order to prevent abnormal heat generation resulting from a large current, resistance of the PTC device 16 increases as a temperature rises. The gasket 17 may be made of, for example, an insulating material. A surface of the gasket 17 may be coated with, for example, asphalt.

For example, a center pin 24 may be inserted in the center of the spirally wound electrode body 20. However, the center pin 24 may not be inserted in the center of the spirally wound electrode body 20. A cathode lead 25 may be attached to the cathode 21, and an anode lead 26 may be attached to the anode 22. The cathode lead 25 may be made of, for example, a conductive material such as aluminum. For example, the cathode lead 25 may be attached to the safety valve mechanism 15, and may be electrically coupled to the battery cover 14. The anode lead 26 may be made of, for example, a conductive material such as nickel. For example, the anode lead 26 may be attached to the battery can 11, and may be electrically coupled to the battery can 11.

[Cathode]

The cathode 21 may include, for example, a cathode current collector 21A and a cathode active material layer 21B provided on both surfaces of the cathode current collector 21A, as illustrated in FIG. 2. Alternatively, the cathode active material layer 21B may be provided on a single surface of the cathode current collector 21A.

The cathode current collector 21A may be made of, for example, one or more of conductive materials. The kind of the conductive material is not particularly limited, but may be, for example, a metal material such as aluminum (Al), nickel (Ni), and stainless steel. The cathode current collector 21A may be configured of a single layer or may be configured of multiple layers.

The cathode active material layer 21B may contain, as a cathode active material, one or more of cathode materials that have ability to insert and extract lithium. It is to be noted that the cathode active material layer 21B may further contain one or more of other materials such as a cathode binder and a cathode conductor, in addition to the cathode active material.

The cathode material may be preferably a lithium-containing compound. More specifically, the cathode material may be preferably one or both of a lithium-containing composite oxide and a lithium-containing phosphate compound, which make it possible to achieve high energy density.

The lithium-containing composite oxide is an oxide that contains lithium and one or more elements that exclude lithium (hereinafter, referred to as "other elements") as constituent elements, and may have, for example, one of a layered rock-salt crystal structure and a spinel crystal structure. The lithium-containing phosphate compound is a phosphate compound that contains lithium and one or more of the other elements as constituent elements, and may have, for example, an olivine crystal structure.

The kinds of the other elements are not particularly limited, as long as the other elements are one or more of any elements. In particular, the other elements may be preferably one or more of elements that belongs to Groups 2 to 15 in the long form of the periodic table of the elements. More specifically, the other elements may more preferably include one or more of nickel (Ni), cobalt (Co), manganese (Mn), and iron (Fe), which make it possible to obtain a high voltage.

Examples of the lithium-containing composite oxide having the layered rock-salt crystal structure may include compounds represented by the following formulas (21) to (23).

$$Li_aMn_{(1-b-c)}Ni_bM11_cO_{(2-d)}Fe \quad (21)$$

where M1 is one or more of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W), "a" to "e" satisfy $0.8 \leq a \leq 1.2$, $0<b<0.5$, $0 \leq c \leq 0.5$, $(b+c)<1$, $-0.1 \leq d \leq 0.2$, and $0 \leq e \leq 0.1$, it is to be noted that the composition of lithium varies depending on charge and discharge states, and "a" is a value in a completely-discharged state.

$$Li_aNi_{(1-b)}M12_bO_{(2-c)}F_d \quad (22)$$

where M12 is one or more of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.8 \leq a \leq 1.2$, $0.0055 \leq b \leq 0.5$, $-0.1 \leq c \leq 0.2$, and $0 \leq d \leq 0.1$, it is to be noted that the composition of lithium varies depending on charge and discharge states, and "a" is a value in a completely-discharged state.

$$Li_aCo_{(1-b)}M13_bO_{(2-c)}F_d \quad (23)$$

where M13 is one or more of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.8 \leq a \leq 1.2$, $0<b<0.5$, $-0.1 \leq c \leq 0.2$, and $0 \leq d \leq 0.1$, it is to be noted that the composition of lithium varies depending on charge and discharge states, and "a" is a value in a completely-discharged state.

Specific examples of the lithium-containing composite oxide having the layered rock-salt crystal structure may include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$.

It is to be noted that in a case in which the lithium-containing composite oxide having the layered rock-salt crystal structure includes nickel, cobalt, manganese, and aluminum as constituent elements, an atomic ratio of nickel may be preferably 50 at % or more, which makes it possible to achieve high energy density.

Examples of the lithium-containing composite oxide having the spinel crystal structure may include a compound represented by the following formula (24).

$$Li_aMn_{(2-b)}M14_bO_cF_d \quad (24)$$

where M14 is one or more of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.9 \le a \le 1.1$, $0 \le b \le 0.6$, $3.7 \le c \le 4.1$, and $0 \le d \le 0.1$, it is to be noted that the composition of lithium varies depending on charge and discharge states, and "a" is a value in a completely-discharged state.

Specific examples of the lithium-containing composite oxide having the spinel crystal structure may include $LiMn_2O_4$.

Examples of the lithium-containing phosphate compound having the olivine crystal structure may include a compound represented by the following formula (25).

$$Li_aM15PO_4 \quad (25)$$

where M15 is one or more of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr), "a" satisfies $0.9 \le a \le 1.1$, it is to be noted that the composition of lithium varies depending on charge and discharge states, and "a" is a value in a completely-discharged state.

Specific examples of the lithium-containing phosphate compound having the olivine crystal structure may include $LiFePO_4$, $LiMnPO_4$, $LiFe_{0.5}Mn_{0.5}PO_4$, and $LiFe_{0.3}Mn_{0.7}PO_4$.

It is to be noted that the lithium-containing composite oxide may be, for example, a compound represented by the following formula (26).

$$(Li_2MnO_3)_x(LiMnO_2)_{1-x} \quad (26)$$

where "x" satisfies $0 \le x \le 1$, it is to be noted that the composition of lithium varies depending on charge and discharge states, and "x" is a value in a completely-discharged state.

In addition, the cathode material may be, for example, one or more of an oxide, a disulfide, a chalcogenide, and a conductive polymer. Examples of the oxide may include titanium oxide, vanadium oxide, and manganese dioxide. Examples of the disulfide may include titanium disulfide and molybdenum sulfide. Examples of the chalcogenide may include niobium selenide. Examples of the conductive polymer may include sulfur, polyaniline, and polythiophene. It is to be noted that the cathode material may be any material other than the materials mentioned above.

The cathode binder may contain one or more of, for example, synthetic rubbers and polymer materials. Examples of the synthetic rubbers may include a styrene-butadiene-based rubber, a fluorine-based rubber, and ethylene propylene diene. Examples of the polymer material may include polyvinylidene fluoride and polyimide.

The cathode conductor may contain one or more of, for example, carbon materials. Examples of the carbon materials may include graphite, carbon black, acetylene black, and Ketjen black. Alternatively, the cathode conductor may be any other material such as a metal material and a conductive polymer, as long as the cathode conductor is a material having conductivity.

[Anode]

The anode 22 may include, for example, an anode current collector 22A and an anode active material layer 22B provided on both surfaces of the anode current collector 22A, as illustrated in FIG. 2. Alternatively, the anode active material layer 22B may be provided on a single surface of the anode current collector 22A.

The anode current collector 22A may be made of, for example, one or more of conductive materials. The kind of the conductive material is not particularly limited, but may be, for example, a metal material such as copper (Cu), aluminum (Al), nickel (Ni), and stainless steel. The anode current collector 22A may be configured of a single layer or may be configured of multiple layers.

A surface of the anode current collector 22A may be preferably roughened. This makes it possible to improve adhesibility of the anode active material layer 22B with respect to the anode current collector 22A by a so-called anchor effect. In this case, it may be only necessary to roughen the surface of the anode current collector 22A at least in a region facing the anode active material layer 22B. Examples of a roughening method may include a method of forming fine particles with use of electrolytic treatment. Through the electrolytic treatment, fine particles are formed on the surface of the anode current collector 22A in an electrolytic bath by an electrolytic method to make the surface of the anode current collector 22A rough. A copper foil fabricated by the electrolytic method is generally called "electrolytic copper foil".

The anode active material layer 22B contains, as an anode active material, one or more of anode materials that have ability to insert and extract lithium. It is to be noted that the anode active material layer 22B may further contain one or more of other materials such as an anode binder and an anode conductor, in addition to the anode active material.

In order to prevent lithium metal from being unintentionally precipitated on the anode 22 in the middle of charge, chargeable capacity of the anode material may be preferably larger than discharge capacity of the cathode 21. In other words, electrochemical equivalent of the anode material that has ability to insert and extract lithium may be preferably larger than electrochemical equivalent of the cathode 21.

The anode material may be, for example, one or more of carbon materials. The carbon material causes an extremely-small change in a crystal structure thereof during insertion and extraction of lithium, which stably achieves high energy density. Further, the carbon material also serves as the anode conductor, which improves conductivity of the anode active material layer 22B.

Examples of the carbon material may include graphitizable carbon, nongraphitizable carbon, and graphite. A spacing of (002) plane in the nongraphitizable carbon may be preferably 0.37 nm or larger, and a spacing of (002) plane in the graphite may be preferably 0.34 nm or smaller. More specific examples of the carbon material may include pyrolytic carbons, cokes, glassy carbon fibers, an organic polymer compound fired body, activated carbon, and carbon blacks. Examples of the cokes may include pitch coke, needle coke, and petroleum coke. The organic polymer compound fired body is a polymer compound fired (carbonized) at an appropriate temperature. Examples of the polymer compound may include phenol resin and furan resin. Other than the materials mentioned above, the carbon material may be low crystalline carbon that is subjected to heat treatment at a temperature of about 1000° C. or lower, or may be amorphous carbon. It is to be noted that a shape of the carbon material may be one or more of a fibrous shape, a spherical shape, a granular shape, and a scale-like shape.

Moreover, the anode material may be, for example, a material (a metal-based material) that contains one or more of metal elements and metalloid elements as constituent elements. This makes it possible to achieve high energy density.

The metal-based material may be any of a simple substance, an alloy, or a compound, may be two or more thereof, or may have one or more phases thereof at least in part. It is to be noted that the "alloy" also encompasses a material that contains one or more metal elements and one or more metalloid elements, in addition to a material that is configured of two or more metal elements. Further, the "alloy" may contain one or more of nonmetallic elements. Examples of a structure of the metal-based material may include a solid solution, a eutectic crystal (a eutectic mixture), an intermetallic compound, and a structure in which two or more thereof coexist.

The metal elements and the metalloid elements mentioned above may be, for example, one or more of metal elements and metalloid elements that are able to form an alloy with lithium. Specific examples thereof may include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc, hafnium (Hf), zirconium, yttrium (Y), palladium (Pd), and platinum (Pt).

In particular, silicon, tin, or both may be preferable. Silicon and tin have superior ability to insert and extract lithium, and achieve remarkably high energy density accordingly.

A material that contains silicon, tin, or both as constituent elements may be any of a simple substance, an alloy, and a compound of silicon, may be any of a simple substance, an alloy, and a compound of tin, may be two or more thereof, or may be a material that has one or more phases thereof at least in part. The simple substance described here merely refers to a simple substance in a general sense (in which a small amount of impurity may be contained), and does not necessarily refer to a simple substance having a purity of 100%.

The alloy of silicon may contain, for example, one or more of elements such as tin, nickel, copper, iron, cobalt, manganese, zinc, indium, silver, titanium, germanium, bismuth, antimony, and chromium, as constituent elements other than silicon. The compound of silicon may contain, for example, one or more of elements such as carbon and oxygen, as constituent elements other than silicon. It is to be noted that the compound of silicon may contain, for example, one or more of the elements described related to the alloy of silicon, as constituent elements other than silicon.

Specific examples of the alloy of silicon and the compound of silicon may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ (0<v≤2), and LiSiO. It is to be noted that "v" in $SiO_v$ may be, for example, in a range of 0.2<v<1.4.

The alloy of tin may contain, for example, one or more of elements such as silicon, nickel, copper, iron, cobalt, manganese, zinc, indium, silver, titanium, germanium, bismuth, antimony, and chromium, as constituent elements other than tin. The compound of tin may contain, for example, one or more of elements such as carbon and oxygen, as constituent elements other than tin. It is to be noted that the compound of tin may contain, for example, one or more of the elements described related to the alloy of tin, as constituent elements other than tin.

Specific examples of the alloy of tin and the compound of tin may include $SnO_w$ (0<w≤2), $SnSiO_3$, LiSnO, and $Mg_2Sn$.

In particular, the material that contains tin as a constituent element may be preferably, for example, a material that contains, together with tin as a first constituent element, a second constituent element and a third constituent element. The second constituent element may include, for example, one or more of elements such as cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, and silicon. The third constituent element may include, for example, one or more of elements such as boron, carbon, aluminum, and phosphorus (P). The Sn-containing material containing the second constituent element and the third constituent element makes it possible to achieve, for example, high battery capacity and superior cycle characteristics.

In particular, the Sn-containing material may be preferably a material (a SnCoC-containing material) that contains tin, cobalt, and carbon as constituent elements. In the SnCoC-containing material, for example, a content of carbon may be from 9.9 mass % to 29.7 mass % both inclusive, and a ratio of contents of tin and cobalt (Co/(Sn+Co)) may be from 20 mass % to 70 mass % both inclusive. This makes it possible to achieve high energy density.

The SnCoC-containing material may preferably have a phase that contains tin, cobalt, and carbon. Such a phase may be preferably low crystalline or amorphous. This phase is a reaction phase that is able to react with lithium. Hence, existence of the reaction phase results in achievement of superior characteristics. A half width (a diffraction angle 2θ) of a diffraction peak obtained by X-ray diffraction of this reaction phase may be preferably 1θ or larger in a case where a CuKα ray is used as a specific X-ray, and an insertion rate is 1°/min. This makes it possible to insert and extract lithium more smoothly, and to decrease reactivity with the electrolytic solution. It is to be noted that, in some cases, the SnCoC-containing material may include a phase that contains simple substances of the respective constituent elements or part thereof in addition to the low-crystalline phase or the amorphous phase.

Comparison between X-ray diffraction charts before and after an electrochemical reaction with lithium makes it possible to easily determine whether the diffraction peak obtained by the X-ray diffraction corresponds to the reaction phase that is able to react with lithium. For example, if a position of the diffraction peak after the electrochemical reaction with lithium is changed from the position of the diffraction peak before the electrochemical reaction with lithium, the obtained diffraction peak corresponds to the reaction phase that is able to react with lithium. In this case, for example, the diffraction peak of the low-crystalline reaction phase or the amorphous reaction phase is seen in a range of 2θ that is from 20° to 50θ both inclusive. Such a reaction phase may include, for example, the respective constituent elements mentioned above, and it may be considered that such a reaction phase has become low crystalline or amorphous mainly because of existence of carbon.

In the SnCoC-containing material, part or all of carbon that is the constituent element thereof may be preferably bound to one or both of a metal element and a metalloid element that are other constituent elements thereof. Binding part or all of carbon suppresses cohesion or crystallization of, for example, tin. It is possible to confirm a binding state of the elements, for example, by X-ray photoelectron spectroscopy (XPS). In a commercially-available apparatus, for example, an Al-Kα ray or a Mg-Kα ray may be used as a soft X-ray. In a case in which part or all of carbon is bound to one or both of the metal element and the metalloid element, a peak of a synthetic wave of is orbit of carbon (C1s) appears in a region lower than 284.5 eV. It is to be noted that energy calibration is so made that a peak of 4f orbit of a gold atom (Au4f) is obtained at 84.0 eV. In this case, in general, surface contamination carbon exists on the material surface. Hence, a peak of C1s of the surface contamination carbon is regarded to be at 284.8 eV, and this peak is used as energy standard. In XPS measurement, a waveform of the peak of C1s is obtained as a form that includes the peak of the surface contamination carbon and the peak of the carbon in the SnCoC-containing material. The two peaks may be therefore separated from each other, for example, by analysis with use of commercially-available software. In the analysis of the waveform, a position of the main peak that exists on the lowest bound energy side is regarded as the energy standard (284.8 eV).

The SnCoC-containing material is not limited to a material (SnCoC) that contains only tin, cobalt, and carbon as constituent elements. The SnCoC-containing material may further contain one or more of, for example, silicon, iron, nickel, chromium, indium, niobium, germanium, titanium, molybdenum, aluminum, phosphorus, gallium, and bismuth, as constituent elements, in addition to tin, cobalt, and carbon.

Other than the SnCoC-containing material, a material (a SnCoFeC-containing material) that contains tin, cobalt, iron, and carbon as constituent elements may be also preferable. Any composition of the SnCoFeC-containing material may be adopted. To give an example, in a case where a content of iron is set smaller, a content of carbon may be from 9.9 mass % to 29.7 mass % both inclusive, a content of iron may be from 0.3 mass % to 5.9 mass % both inclusive, and a ratio of contents of tin and cobalt (Co/(Sn+Co)) may be from 30 mass % to 70 mass % both inclusive. Alternatively, in a case where the content of iron is set larger, the content of carbon may be from 11.9 mass % to 29.7 mass % both inclusive, the ratio of contents of tin, cobalt, and iron ((Co+Fe)/(Sn+Co+Fe)) may be from 26.4 mass % to 48.5 mass % both inclusive, and the ratio of contents of cobalt and iron (Co/(Co+Fe)) may be from 9.9 mass % to 79.5 mass % both inclusive. Such composition ranges allow for achievement of high energy density. It is to be noted that physical characteristics (such as a half width) of the SnCoFeC-containing material are similar to physical characteristics of the foregoing SnCoC-containing material.

Other than the materials mentioned above, the anode material may be one or more of, for example, a metal oxide and a polymer compound. Examples of the metal oxide may include iron oxide, ruthenium oxide, and molybdenum oxide. Examples of the polymer compound may include polyacetylene, polyaniline, and polypyrrole.

In particular, the anode material may preferably contain both the carbon material and the metal-based material for the following reason.

The metal-based material, in particular, the material containing one or both of silicon and tin as constituent elements has a concern that such a material is easily and radically expanded or contracted during charge and discharge, whereas such a material has an advantage of high theoretical capacity. In contrast, the carbon material has an advantage that the carbon material is less prone to be expanded or contracted during charge and discharge, whereas the carbon material has a concern of low theoretical capacity. Hence, using both of the carbon material and the metal-based material makes it possible to suppress expansion and contraction during charge and discharge while achieving high theoretical capacity (in other words, high battery capacity).

The anode active material layer 22B may be formed by, for example, one or more of a coating method, a vapor-phase method, a liquid-phase method, a spraying method, and a firing method (sintering method). The coating method may be, for example, a method in which, after a particulate (powder) anode active material is mixed with, for example, an anode binder, the mixture is dispersed in, for example, an organic solvent, and the resultant is applied onto the anode current collector 22A. Examples of the vapor-phase method may include a physical deposition method and a chemical deposition method. More specifically, examples thereof may include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase method may include an electrolytic plating method and an electroless plating method. The spraying method is a method in which an anode active material in a fused state or a semi-fused state is sprayed to the anode current collector 22A. The firing method may be, for example, a method in which, after the mixture dispersed in, for example, an organic solvent is applied onto the anode current collector 22A by the coating method, the resultant is subjected to heat treatment at a temperature higher than a melting point of, for example, the anode binder. For example, one or more of firing methods such as an atmosphere firing method, a reactive firing method, and a hot press firing method may be employed as the firing method.

In the secondary battery, as described above, in order to prevent lithium metal from being unintentionally precipitated on the anode 22 in the middle of charge, the electrochemical equivalent of the anode material that has ability to insert and extract lithium may be preferably larger than the electrochemical equivalent of the cathode. Moreover, in a case in which an open circuit voltage (that is, a battery voltage) in a completely-charged state is 4.25 V or higher, an extraction amount of lithium per unit mass is larger than that in a case in which the open circuit voltage is 4.20 V, even if the same cathode active material is used. Hence, amounts of the cathode active material and the anode active material are adjusted in accordance therewith. As a result, high energy density is achieved.

[Separator]

For example, the separator 23 may be provided between the cathode 21 and the anode 22, as illustrated in FIG. 2. The separator 23 separates the cathode 21 from the anode 22, and passes lithium ions therethrough while preventing current short circuit that results from contact between the cathode 21 and the anode 22.

The separator 23 may be, for example, one or more of porous films such as porous films of a synthetic resin and ceramics. The separator 23 may be a laminated film in which two or more porous films are laminated. Examples of the synthetic resin may include polytetrafluoroethylene, polypropylene, and polyethylene.

In particular, the separator 23 may include, for example, the foregoing porous film (a base layer) and a polymer compound layer provided on a single surface or both surfaces of the base layer. This makes it possible to improve adhesibility of the separator 23 with respect to each of the cathode 21 and the anode 22, thereby suppressing deformation of the spirally wound electrode body 20. This makes it possible to suppress decomposition reaction of the electrolytic solution and to suppress liquid leakage of the electrolytic solution with which the base layer is impregnated. Accordingly, even if charge and discharge are repeated, resistance is less prone to increase, and battery swollenness is suppressed.

The polymer compound layer may contain, for example, a polymer material such as polyvinylidene fluoride, which has high physical strength and is electrochemically stable. The polymer material may be any material other than polyvinylidene fluoride. In order to form the polymer compound layer, for example, the base layer may be coated with a solution prepared by dissolving the polymer material in, for example, an organic solvent, and thereafter, the base layer may be dried. Alternatively, the base layer may be immersed in the solution, and thereafter the base layer may be dried.

[Electrolytic Solution]

The spirally wound electrode body 20 is impregnated with the electrolytic solution, as described above. The electrolytic solution has a similar configuration to that of the foregoing electrolytic solution of the present technology. In other words, the electrolytic solution may contain one or more of the cyano compounds.

[Operation of Secondary Battery]

The secondary battery may operate as follows, for example.

When the secondary battery is charged, lithium ions are extracted from the cathode 21 and the extracted lithium ions are inserted in the anode 22 through the electrolytic solution. In contrast, when the secondary battery is discharged, lithium ions are extracted from the anode 22 and the extracted lithium ions are inserted in the cathode 21 through the electrolytic solution.

[Method of Manufacturing Secondary Battery]

The secondary battery may be manufactured by the following procedure, for example.

When fabricating the cathode 21, first, the cathode active material, and, on as-necessary basis, for example, the cathode binder and the cathode conductor may be mixed to obtain a cathode mixture. Subsequently, the cathode mixture may be dispersed in, for example, an organic solvent to obtain paste cathode mixture slurry. Next, both surfaces of the cathode current collector 21A may be coated with the cathode mixture slurry, and thereafter, the coated cathode mixture slurry may be dried to form the cathode active material layer 21B. Thereafter, the cathode active material layer 21B may be compression-molded with use of, for example, a roll pressing machine, while being heated on as-necessary basis. In this case, the cathode active material layer 21B may be compression-molded a plurality of times.

When fabricating the anode 22, the anode active material layer 22B may be formed on the anode current collector 22A by a procedure similar to the foregoing procedure of fabricating the cathode 21. More specifically, the anode active material, and, on as-necessary basis, for example, the anode-cathode binder and the anode conductor may be mixed to obtain an anode mixture. Subsequently, the anode mixture may be dispersed in, for example, an organic solvent to obtain paste anode mixture slurry. Next, both surfaces of the anode current collector 22A may be coated with the anode mixture slurry, and thereafter, the coated anode mixture slurry may be dried to form the anode active material layer 22B. Lastly, the anode active material layer 22B may be compression-molded with use of, for example, a roll pressing machine.

When assembling the secondary battery, the cathode lead 25 may be attached to the cathode current collector 21A by, for example, a welding method, and the anode lead 26 may be attached to the anode current collector 22A by, for example, a welding method. Subsequently, the cathode 21 and the anode 22 may be stacked with the separator 23 in between. Next, the cathode 21, the anode 22, and the separator 23 may be spirally wound to form the spirally wound electrode body 20. Thereafter, the center pin 24 may be inserted in the center of the spirally wound electrode body 20.

Subsequently, the spirally wound electrode body 20 may be sandwiched between the pair of insulating plates 12 and 13, and may be contained inside the battery can 11. In this case, an end tip of the cathode lead 25 may be attached to the safety valve mechanism 15 by, for example, a welding method, and an end tip of the anode lead 26 may be attached to the battery can 11 by, for example, a welding method. Subsequently, the electrolytic solution may be injected inside the battery can 11, and the spirally wound electrode body 20 may be impregnated with the injected electrolytic solution. Lastly, the battery cover 14, the safety valve mechanism 15, and the PTC device 16 may be swaged with the gasket 17 at the open end of the battery can 11. Thus, the cylindrical type secondary battery is completed.

[Action and Effects of Secondary Battery]

According to the secondary battery, the electrolytic solution has a configuration similar to the foregoing electrolytic solution of the present technology. Hence, decomposition reaction of the electrolytic solution during charge and discharge is suppressed, as described above. This makes it possible to achieve superior battery characteristics. Action and effects other than those described above are similar to those of the electrolytic solution of the present technology.

<2-2. Lithium-Ion Secondary Battery (Laminated Film Type)>

FIG. 3 illustrates a perspective configuration of another secondary battery, and FIG. 4 illustrates a cross-section taken along a line IV-IV of a spirally wound electrode body 30 illustrated in FIG. 3. It is to be noted that FIG. 3 illustrates a state in which the spirally wound electrode body 30 and an outer package member 40 are separated from each other.

In the following description, the components of the cylindrical type secondary battery that have been already described are used where appropriate.

[Whole Configuration of Secondary Battery]

The secondary battery may be a lithium-ion secondary battery having a so-called laminated film type battery configuration. In the secondary battery, for example, the spirally wound electrode body 30 as a battery element may be contained inside the film-like outer package member 40, as illustrated in FIG. 3. In the spirally wound electrode body 30, for example, a cathode 33 and an anode 34 may be stacked with a separator 35 and an electrolyte layer 36 in between, and the cathode 33, the anode 34, the separator 35, and the electrolyte layer 36 may be spirally wound. A cathode lead 31 may be attached to the cathode 33, and an anode lead 32 may be attached to the anode 34. An outermost periphery of the spirally wound electrode body 30 may be protected by a protective tape 37.

Each of the cathode lead 31 and the anode lead 32 may be led out from inside to outside of the outer package member 40 in a same direction, for example. The cathode lead 31 may be made of, for example, one or more of conductive materials such as aluminum (Al). The anode lead 32 may be made of, for example, one or more of conductive materials such as copper (Cu), nickel (Ni), and stainless steel. These conductive materials may have, for example, a thin-plate shape or a mesh shape.

The outer package member 40 may be, for example, one film that is foldable in a direction of an arrow R illustrated in FIG. 3, and the outer package member 40 may have a depression for containing of the spirally wound electrode body 30 in part thereof. The outer package member 40 may be a laminated film in which a fusion bonding layer, a metal layer, and a surface protective layer are laminated in this order, for example. In a process of manufacturing the secondary battery, the outer package member 40 may be folded so that portions of the fusion-bonding layer face each other with the spirally wound electrode body 30 in between, and thereafter outer edges of the portions of the fusion bonding layer may be fusion-bonded. Alternatively, two laminated films bonded to each other by, for example, an adhesive may form the outer package member 40. Examples of the fusion bonding layer may include a film made of one or more of polyethylene, polypropylene, and other materials. The metal layer may include, for example, one or more of an aluminum foil and other metal materials. The surface protective layer may be, for example, a film made of one or more of nylon, polyethylene terephthalate, and other materials.

In particular, the outer package member 40 may be preferably an aluminum laminated film in which a polyethylene film, an aluminum foil, and a nylon film are laminated in this order. However, the outer package member 40 may be a laminated film having any other laminated structure, a polymer film such as polypropylene, or a metal film.

For example, an adhesive film 41 for prevention of outside air intrusion may be inserted between the outer package member 40 and the cathode lead 31. Moreover, for example, the foregoing adhesive film 41 may be inserted between the outer package member 40 and the anode lead 32. The adhesive film 41 may be made of a material having adhesibility with respect to the cathode lead 31 and the anode lead 32. Examples of the material having adhesibility may include a polyolefin resin. More specific examples thereof may include one or more of polyethylene, polypropylene, modified polyethylene, and modified polypropylene.

[Cathode, Anode, and Separator]

The cathode 33 may include, for example, a cathode current collector 33A and a cathode active material layer 33B, and the anode 34 may include, for example, an anode current collector 34A and an anode active material layer 34B. The configurations of the cathode current collector 33A, the cathode active material layer 33B, the anode current collector 34A, and the anode active material layer 34B may be similar to, for example, the configurations of the cathode current collector 21A, the cathode active material layer 21B, the anode current collector 22A, and the anode active material layer 22B, respectively. The configuration of the separator 35 may be similar to, for example, the configuration of the separator 23.

The electrolyte layer 36 may include an electrolytic solution and a polymer compound. The configuration of the electrolytic solution may be similar to, for example, the configuration of the foregoing electrolytic solution of the present technology. The electrolyte layer 36 described here may be a so-called gel electrolyte, and the electrolytic solution may be held by the polymer compound. The gel electrolyte achieves high ionic conductivity (for example, 1 mSi/cm or more at room temperature), and prevents liquid leakage of the electrolytic solution. It is to be noted that the electrolyte layer 36 may further include one or more of other materials such as an additive.

The polymer material may contain, for example, one or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, poly(methyl methacrylate), polyacrylic acid, polymethacrylic acid, styrene-butadiene rubber, nitrile-butadiene rubber, polystyrene, and polycarbonate. In addition thereto, the polymer material may be a copolymer. The copolymer may be, for example, a copolymer of vinylidene fluoride and hexafluoropropylene. In particular, polyvinylidene fluoride may be preferable as a homopolymer, and a copolymer of vinylidene fluoride and hexafluoropropylene may be preferable as a copolymer. Such polymer compounds are electrochemically stable.

In the electrolyte layer 36 that is a gel electrolyte, the solvent contained in the electrolytic solution refers to a wide concept that encompasses not only a liquid material but also a material having ionic conductivity that has ability to dissociate the electrolyte salt. Hence, in a case in which a polymer compound having ionic conductivity is used, the polymer compound is also encompassed by the solvent.

It is to be noted that the electrolytic solution may be used as it is instead of the gel electrolyte layer 36. In this case, the spirally wound electrode body 30 is impregnated with the electrolytic solution.

[Operation of Secondary Battery]

The secondary battery may operate, for example, as follows.

When the secondary battery is charged, lithium ions are extracted from the cathode 33, and the extracted lithium ions are inserted in the anode 34 through the electrolyte layer 36. In contrast, when the secondary battery is discharged, lithium ions are extracted from the anode 34, and the extracted lithium ions are inserted in the cathode 33 through the electrolyte layer 36.

[Method of Manufacturing Secondary Battery]

The secondary battery including the gel electrolyte layer 36 may be manufactured, for example, by one of the following three procedures.

In a first procedure, the cathode 33 and the anode 34 may be fabricated by a fabrication procedure similar to that of the cathode 21 and the anode 22. More specifically, the cathode 33 may be fabricated by forming the cathode active material layer 33B on both surfaces of the cathode current collector 33A, and the anode 34 may be fabricated by forming the anode active material layer 34B on both surfaces of the anode current collector 34A. Subsequently, for example, the electrolytic solution, the polymer compound, and an organic solvent may be mixed to prepare a precursor solution. Subsequently, each of the cathode 33 and the anode 34 may be coated with the precursor solution, and the coated precursor solution may be dried to form the gel electrolyte layer 36. Subsequently, the cathode lead 31 may be attached to the cathode current collector 33A by, for example, a welding method, and the anode lead 32 may be attached to the anode current collector 34A by, for example, a welding method. Subsequently, the cathode 33 and the anode 34 may be stacked with the separator 35 in between, and thereafter, the cathode 33, the anode 34, and the separator 35 may be spirally wound to fabricate the spirally wound electrode body 30. Thereafter, the protective tape 37 may be attached onto the outermost periphery of the spirally wound body 30. Subsequently, the outer package member 40 may be folded to interpose the spirally wound electrode body 30, and thereafter, the outer edges of the outer package member 40 may be bonded by, for example, a thermal fusion bonding method to enclose the spirally wound electrode body 30 in the outer package member 40. In this case, the adhesive film 41 may be inserted between the cathode lead 31 and the outer package member 40, and the adhesive film 41 may be inserted between the anode lead 32 and the outer package member 40.

In a second procedure, the cathode lead 31 may be attached to the cathode 33, and the anode lead 32 may be attached to the anode 34. Subsequently, the cathode 33 and the anode 34 may be stacked with the separator 35 in between and may be spirally wound to fabricate a spirally wound body as a precursor of the spirally wound electrode body 30. Thereafter, the protective tape 37 may be adhered to the outermost periphery of the spirally wound body. Subsequently, the outer package member 40 may be folded to interpose the spirally wound electrode body 30, and thereafter, the outer edges other than one side of the outer package member 40 may be bonded by, for example, a thermal fusion bonding method, and the spirally wound body may be contained inside a pouch formed of the outer package member 40. Subsequently, the electrolytic solution, monomers that are raw materials of the polymer compound, a polymerization initiator, and, on as-necessary basis, other materials such as a polymerization inhibitor may be mixed to prepare a composition for electrolyte. Subsequently, the composition for electrolyte may be injected inside the pouch formed of the outer package member 40. Thereafter, the pouch formed of the outer package member 40 may be hermetically sealed by, for example, a thermal fusion bonding method. Subsequently, the monomers may be thermally polymerized to form the polymer compound. Thus, the electrolytic solution may be held by the polymer compound to form the gel electrolyte layer 36.

In a third procedure, the spirally wound body may be fabricated, and then contained inside the pouch formed of the outer package member 40 in a manner similar to that of the second procedure described above, except that the separator 35 provided with the polymer compound layer is used. Subsequently, the electrolytic solution may be prepared, and then injected inside the pouch formed of the outer package member 40. Thereafter, an opening of the pouch formed of the outer package member 40 may be hermetically sealed by, for example, a thermal fusion bonding method. Subsequently, the resultant may be heated while a weight is applied to the outer package member 40 to cause the separator 35 to be closely attached to the cathode 33 with the polymer compound layer in between and to be closely attached to the anode 34 with the polymer compound layer in between. Thus, each of the polymer compound layers may be impregnated with the electrolytic solution, and each of the polymer compound layers may be gelated. Thus, the electrolyte layer 36 may be formed.

In the third procedure, swollenness of the secondary battery is suppressed more than in the first procedure. Further, in the third procedure, for example, the nonaqueous solvent and the monomers (the raw materials of the polymer compound) are hardly left in the electrolyte layer 36, as compared with the second procedure. Accordingly, the formation process of the polymer compound is favorably controlled. As a result, each of the cathode 33, the anode 34, and the separator 35 is sufficiently and closely attached to the electrolyte layer 36.

[Action and Effects of Secondary Battery]

According to the secondary battery, the electrolyte layer 36 contains the electrolytic solution, and the electrolytic solution has a configuration similar to that of the foregoing electrolytic solution of the present technology. Therefore, superior battery characteristics are achievable for a reason similar to the reason in the foregoing cylindrical type secondary battery. Action and effects other than those described above are similar to those of the cylindrical type secondary battery.

<2-3. Lithium Metal Secondary Battery>

A secondary battery described here is a cylindrical type secondary battery (lithium metal secondary battery) in which the capacity of the anode 22 is obtained by precipitation and dissolution of lithium metal. The secondary battery has a configuration similar to that of the foregoing lithium-ion secondary battery (cylindrical type), and is manufactured by a similar procedure, except that the anode active material layer 22B is made of the lithium metal.

In the secondary battery, the lithium metal is used as an anode active material, and high energy density is thereby achievable. The anode active material layer 22B may exist at the time of assembling, or the anode active material layer 22B may not necessarily exist at the time of assembling and may be made of the lithium metal precipitated during charge. Further, the anode active material layer 22B may be used as a current collector, and the anode current collector 22A may be omitted.

The secondary battery may operate, for example, as follows. When the secondary battery is charged, lithium ions are extracted from the cathode 21, and the extracted lithium ions are precipitated as the lithium metal on the surface of the anode current collector 22A through the electrolytic solution. In contrast, when the secondary battery is discharged, the lithium metal is eluded as lithium ions from the anode active material layer 22B, and is inserted in the cathode 21 through the electrolytic solution.

According to the cylindrical type lithium metal secondary battery, the electrolytic solution has a configuration similar to that of the foregoing electrolytic solution of the present technology. Therefore, superior battery characteristics are achievable for a reason similar to the reason in the foregoing lithium-ion secondary battery. Action and effects other than those described above are similar to those of the lithium-ion secondary battery.

It is to be noted that the lithium metal secondary battery described here is not limited to the cylindrical type secondary battery, and may be a laminated film type secondary battery. Even in this case, similar effects are achievable.

<3. Applications of Secondary Battery>

Next, description is given of application examples of any of the secondary batteries mentioned above.

Applications of the secondary battery are not particularly limited as long as the secondary battery is applied to, for example, a machine, a device, an instrument, an apparatus, and a system (a collective entity of, for example, a plurality of devices) that are able to use the secondary battery as a driving power source, an electric power storage source for electric power accumulation, or any other source. The secondary battery used as the power source may be a main power source (a power source used preferentially), or may be an auxiliary power source (a power source used instead of the main power source or used being switched from the main power source). In a case in which the secondary battery is used as the auxiliary power source, the kind of the main power source is not limited to the secondary battery.

Examples of the applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof may include: a mobile lifestyle appliance such as an electric shaver; a storage device such as a backup power source and a memory card; an electric power tool such as an electric drill and an electric saw; a battery pack used as an attachable and detachable power source of, for example, a notebook personal computer; a medical electronic apparatus such as a pacemaker and a hearing aid; an electric vehicle such as an electric automobile (including a hybrid automobile); and an electric power storage system such as a home battery system for accumulation of electric power for, for example, emergency. It goes without saying that the secondary battery may be employed for an application other than the applications mentioned above.

In particular, the secondary battery may be effectively applicable to, for example, the battery pack, the electric vehicle, the electric power storage system, the electric power tool, and the electronic apparatus. In these applications, superior battery characteristics are demanded, and using the secondary battery of the present technology makes it possible to effectively improve performance. It is to be noted that the battery pack is a power source that uses the secondary battery, and may be, for example, an assembled battery. The electric vehicle is a vehicle that operates (runs) using the secondary battery as a driving power source, and may be an automobile (such as a hybrid automobile) that includes together a drive source other than the secondary battery, as described above. The electric power storage system is a system that uses the secondary battery as an electric power storage source. For example, in a home electric power storage system, electric power is accumulated in the secondary battery that is the electric power storage source, which makes it possible to use, for example, home electric products with use of the accumulated electric power. The electric power tool is a tool in which a movable section (such as a drill) is allowed to be moved with use of the secondary battery as a driving power source. The electronic apparatus is an apparatus that executes various functions with use of the secondary battery as a driving power source (an electric power supply source).

Hereinafter, specific description is given of some application examples of the secondary battery. It is to be noted that configurations of the respective application examples described below are mere examples, and may be changed as appropriate.

<3-1. Battery Pack (Single Battery)>

FIG. 5 illustrates a perspective configuration of a battery pack using a single battery. FIG. 6 illustrates a block configuration of the battery pack illustrated in FIG. 5. It is to be noted that FIG. 5 illustrates the battery pack in an exploded state.

The battery pack described here is a simple battery pack using one secondary battery (a so-called soft pack), and may be mounted in, for example, an electronic apparatus typified by a smartphone. For example, the battery pack may include a power source 111 that is the laminated film type secondary battery, and a circuit board 116 coupled to the power source 111, as illustrated in FIG. 5. A cathode lead 112 and an anode lead 113 may be attached to the power source 111.

A pair of adhesive tapes 118 and 119 may be adhered to both side surfaces of the power source 111. A protection circuit module (PCM) may be formed in the circuit board 116. The circuit board 116 may be coupled to the cathode 112 through a tab 114, and be coupled to the anode lead 113 through a tab 115. Moreover, the circuit board 116 may be coupled to a lead 117 provided with a connector for external connection. It is to be noted that while the circuit board 116 is coupled to the power source 111, the circuit board 116 may be protected from upper side and lower side by a label 120 and an insulating sheet 121. The label 120 may be adhered to fix, for example, the circuit board 116 and the insulating sheet 121.

Moreover, for example, the battery pack may include the power source 111 and the circuit board 116 as illustrated in FIG. 6. The circuit board 116 may include, for example, a controller 121, a switch section 122, a PTC 123, and a temperature detector 124. The power source 111 is connectable to outside through a cathode terminal 125 and an anode terminal 127, and is thereby charged and discharged through the cathode terminal 125 and the anode terminal 127. The temperature detector 124 is allowed to detect a temperature with use of a temperature detection terminal (a so-called T terminal) 126.

The controller 121 controls an operation of the entire battery pack (including a used state of the power source 111), and may include, for example, a central processing unit (CPU) and a memory.

For example, in a case in which a battery voltage reaches an overcharge detection voltage, the controller 121 may so cause the switch section 122 to be disconnected that a charge current does not flow into a current path of the power source 111. Moreover, for example, in a case in which a large current flows during charge, the controller 121 may cause the switch section 122 to be disconnected, thereby blocking the charge current.

In addition, for example, in a case in which the battery voltage reaches an overdischarge detection voltage, the controller 121 may so cause the switch section 122 to be disconnected that a discharge current does not flow into the current path of the power source 111. Moreover, for example, in a case in which a large current flows during discharge, the controller 121 may cause the switch section 122 to be disconnected, thereby blocking the discharge current.

It is to be noted that the overcharge detection voltage of the secondary battery may be, for example, $4.20 \text{ V} \pm 0.05 \text{ V}$, and the overdischarge detection voltage may be, for example, $2.4 \text{ V} \pm 0.1 \text{ V}$.

The switch section 122 switches the used state of the power source 111 (whether the power source 111 is connectable to an external device) in accordance with an instruction from the controller 121. The switch section 122 may include, for example, a charge control switch and a discharge control switch. The charge control switch and the discharge control switch each may be, for example, a semiconductor switch such as a field-effect transistor using a metal oxide semiconductor (MOSFET). It is to be noted that the charge current and the discharge current may be detected on the basis of on-resistance of the switch section 122.

The temperature detector 124 measures a temperature of the power source 111, and outputs a result of the measurement to the controller 121. The temperature detector 124 may include, for example, a temperature detecting element such as a thermistor. It is to be noted that the result of the measurement by the temperature detector 124 may be used, for example, in a case in which the controller 121 performs charge and discharge control at the time of abnormal heat generation and in a case in which the controller 121 performs a correction process at the time of calculating remaining capacity.

It is to be noted that the circuit board 116 may not include the PTC 123. In this case, a PTC element may be separately attached to the circuit board 116.

<3-2. Battery Pack (Assembled Battery)>

FIG. 7 illustrates a block configuration of a battery pack using an assembled battery. For example, the battery pack may include a controller 61, a power source 62, a switch section 63, a current measurement section 64, a temperature detector 65, a voltage detector 66, a switch controller 67, a memory 68, a temperature detecting element 69, a current detection resistance 70, a cathode terminal 71, and an anode terminal 72 inside a housing 60. The housing 60 may be made of, for example, a plastic material.

The controller 61 controls an operation of the entire battery pack (including a used state of the power source 62), and may include, for example, a CPU. The power source 62 includes one or more secondary batteries of the present technology. The power source 62 may be, for example, an assembled battery that includes two or more secondary batteries. The secondary batteries may be connected in series, in parallel, or in series-parallel combination. To give an example, the power source 62 may include six secondary batteries in which two sets of series-connected three batteries are connected in parallel to each other.

The switch section 63 switches the used state of the power source 62 (whether the power source 62 is connectable to an external device) in accordance with an instruction from the controller 61. The switch section 63 may include, for example, a charge control switch, a discharge control switch, a charging diode, and a discharging diode. The charge control switch and the discharge control switch each may be, for example, a semiconductor switch such as a field-effect transistor that uses a metal oxide semiconductor (a MOSFET).

The current measurement section 64 measures a current with use of the current detection resistance 70, and outputs a result of the measurement to the controller 61. The temperature detector 65 measures a temperature with use of the temperature detecting element 69, and outputs a result of the measurement to the controller 61. The result of the temperature measurement may be used, for example, in a case in which the controller 61 performs charge and discharge control at the time of abnormal heat generation and in a case in which the controller 61 performs a correction process at the time of calculating remaining capacity. The voltage detector 66 measures voltages of the secondary batteries in the power source 62, performs analog-to-digital conversion on the measured voltage, and supplies the resultant to the controller 61.

The switch controller 67 controls an operation of the switch section 63 in accordance with signals inputted from the current measurement section 64 and the voltage detector 66.

For example, in a case in which a battery voltage reaches an overcharge detection voltage, the switch controller 67 may so cause the switch section 63 (the charge control switch) to be disconnected that a charge current does not flow into a current path of the power source 62. This makes it possible to perform only discharge through the discharging diode in the power source 62. It is to be noted that, for example, when a large current flows during charge, the switch controller 67 may block the charge current.

Further, for example, in a case in which the battery voltage reaches an overdischarge detection voltage, the switch controller 67 may so cause the switch section 63 (the discharge control switch) to be disconnected that a discharge current does not flow into the current path of the power source 62. This makes it possible to perform only charge through the charging diode in the power source 62. It is to be noted that, for example, when a large current flows during discharge, the switch controller 67 may block the discharge current.

It is to be noted that the overcharge detection voltage of the secondary battery may be, for example, 4.20 V±0.05 V, and the overdischarge detection voltage may be, for example, 2.4 V±0.1 V.

The memory 68 may be, for example, an EEPROM that is a non-volatile memory. The memory 68 may hold, for example, numerical values calculated by the controller 61 and information of the secondary battery measured in a manufacturing process (such as internal resistance in an initial state). It is to be noted that, in a case in which the memory 68 holds full charge capacity of the secondary battery, the controller 61 is allowed to comprehend information such as remaining capacity.

The temperature detecting element 69 measures a temperature of the power source 62, and outputs a result of the measurement to the controller 61. The temperature detecting element 69 may be, for example, a thermistor.

The cathode terminal 71 and the anode terminal 72 are terminals that may be coupled to, for example, an external device (such as a notebook personal computer) driven with use of the battery pack or an external device (such as a battery charger) used for charge of the battery pack. The power source 62 is charged and discharged via the cathode terminal 71 and the anode terminal 72.

<3-3. Electric Vehicle>

FIG. 8 illustrates a block configuration of a hybrid automobile that is an example of an electric vehicle. The electric vehicle may include, for example, a controller 74, an engine 75, a power source 76, a driving motor 77, a differential 78, an electric generator 79, a transmission 80, a clutch 81, inverters 82 and 83, and various sensors 84 inside a housing 73 made of metal. Other than the components mentioned above, the electric vehicle may include, for example, a front drive shaft 85 and a front tire 86 that are coupled to the differential 78 and the transmission 80, and a rear drive shaft 87, and a rear tire 88.

The electric vehicle may be runnable with use of one of the engine 75 and the motor 77 as a drive source, for example. The engine 75 is a main power source, and may be, for example, a petrol engine. In a case in which the engine 75 is used as the power source, drive power (torque) of the engine 75 may be transferred to the front tire 86 or the rear tire 88 via the differential 78, the transmission 80, and the clutch 81 that are drive sections, for example. It is to be noted that the torque of the engine 75 may be also transferred to the electric generator 79. With use of the torque, the electric generator 79 generates alternating-current electric power. The generated alternating-current electric power is converted into direct-current electric power via the inverter 83, and the converted electric power is accumulated in the power source 76. In a case in which the motor 77 that is a conversion section is used as the power source, electric power (direct-current electric power) supplied from the power source 76 is converted into alternating-current electric power via the inverter 82, and the motor 77 is driven with use of the alternating-current electric power. Drive power (torque) obtained by converting the electric power by the motor 77 may be transferred to the front tire 86 or the rear tire 8 via the differential 78, the transmission 80, and the clutch 81 that are the drive sections, for example.

It is to be noted that, when speed of the electric vehicle is decreased by a brake mechanism, resistance at the time of speed reduction may be transferred to the motor 77 as torque, and the motor 77 may generate alternating-current electric power by utilizing the torque. It may be preferable that this alternating-current electric power be converted into direct-current electric power via the inverter 82, and the direct-current regenerative electric power be accumulated in the power source 76.

The controller 74 controls an operation of the entire electric vehicle, and may include, for example, a CPU. The power source 76 includes one or more secondary batteries of the present technology. The power source 76 may be coupled to an external power source, and the power source 76 may be allowed to accumulate electric power by receiving electric power supply from the external power source. The various sensors 84 may be used, for example, for control of the number of revolutions of the engine 75 and for control of an opening level (a throttle opening level) of a throttle valve. The various sensors 84 may include, for example, a speed sensor, an acceleration sensor, and an engine frequency sensor.

It is to be noted that, although the description has been given of the case in which the electric vehicle is the hybrid automobile, the electric vehicle may be a vehicle (an electric automobile) that operates with use of only the power source 76 and the motor 77 and without using the engine 75.

<3-4. Electric Power Storage System>

FIG. 9 illustrates a block configuration of an electric power storage system. The electric power storage system may include, for example, a controller 90, a power source 91, a smart meter 92, and a power hub 93 inside a house 89 such as a general residence or a commercial building.

In this example, the power source 91 may be coupled to an electric device 94 provided inside the house 89 and may be allowed to be coupled to an electric vehicle 96 parked outside the house 89, for example. Further, for example, the power source 91 may be coupled to a private power generator 95 provided in the house 89 via the power hub 93, and may be allowed to be coupled to an outside concentrating electric power system 97 via the smart meter 92 and the power hub 93.

It is to be noted that the electric device 94 may include, for example, one or more home electric products. Examples of the home electric products may include a refrigerator, an air conditioner, a television, and a water heater. The private power generator 95 may include, for example, one or more of a solar power generator, a wind power generator, and other power generators. The electric vehicle 96 may include, for example, one or more of an electric automobile, an electric motorcycle, a hybrid automobile, and other electric vehicles. The concentrating electric power system 97 may include, for example, one or more of a thermal power plant, an atomic power plant, a hydraulic power plant, a wind power plant, and other power plants.

The controller 90 controls an operation of the entire electric power storage system (including a used state of the power source 91), and may include, for example, a CPU. The power source 91 includes one or more secondary batteries of the present technology. The smart meter 92 may be an electric power meter that is compatible with a network and is provided in the house 89 demanding electric power, and may be communicable with an electric power supplier, for example. Accordingly, for example, while the smart meter 92 communicates with outside, the smart meter 92 controls balance between supply and demand in the house 89, which allows for effective and stable energy supply.

In the electric power storage system, for example, electric power may be accumulated in the power source 91 from the concentrating electric power system 97, that is an external power source, via the smart meter 92 and the power hub 93, and electric power may be accumulated in the power source 91 from the private power generator 95, that is an independent power source, via the power hub 93. The electric power accumulated in the power source 91 is supplied to the electric device 94 and the electric vehicle 96 in accordance with an instruction from the controller 90. This allows the electric device 94 to be operable, and allows the electric vehicle 96 to be chargeable. In other words, the electric power storage system is a system that makes it possible to accumulate and supply electric power in the house 89 with use of the power source 91.

The electric power accumulated in the power source 91 is allowed to be utilized optionally. Hence, for example, electric power may be accumulated in the power source 91 from the concentrating electric power system 97 in the middle of night when an electric rate is inexpensive, and the electric power accumulated in the power source 91 may be used during daytime hours when the electric rate is expensive.

It is to be noted that the foregoing electric power storage system may be provided for each household (each family unit), or may be provided for a plurality of households (a plurality of family units).

<3-5. Electric Power Tool>

FIG. 10 illustrates a block configuration of an electric power tool. The electric power tool may be, for example, an electric drill, and may include a controller 99 and a power source 100 inside a tool body 98 made of a plastic material, for example. A drill section 101 that is a movable section may be attached to the tool body 98 in an operable (rotatable) manner, for example.

The controller 99 controls an operation of the entire electric power tool (including a used state of the power source 100), and may include, for example, a CPU. The power source 100 includes one or more secondary batteries of the present technology. The controller 99 allows electric power to be supplied from the power source 100 to the drill section 101 in accordance with an operation by an operation switch.

EXAMPLES

Examples of the present technology will be described in detail below.

Experimental Examples 1-1 to 1-5

The laminated film type lithium-ion secondary batteries illustrated in FIGS. 3 and 4 were fabricated by the following procedure.

The cathode 33 was fabricated as follows. First, 90 parts by mass of a cathode active material ($LiCoO_2$), 5 parts by mass of a cathode binder (polyvinylidene fluoride), and 5 parts by mass of a cathode conductor (ketjen black) were mixed to obtain a cathode mixture. Subsequently, the cathode mixture was dispersed in an organic solvent (N-methyl-2-pyrrolidone) to obtain cathode mixture slurry. Subsequently, both surfaces of the cathode current collector 33A (an aluminum foil having a thickness of 15 µm) were uniformly coated with the cathode mixture slurry, and thereafter, the cathode mixture slurry was dried to form the cathode active material layer 33B. Lastly, the cathode active material layer 33B was compression-molded with use of a roll pressing machine, and thereafter, the cathode current collector 33A on which the cathode active material layer 33B was formed was cut into a strip shape (48 mm×300 mm).

The anode 34 was fabricated as follows. First, 90 parts by mass of an anode active material (artificial graphite) and 10 parts by mass of an anode binder (polyvinylidene fluoride) were mixed to obtain an anode mixture. Subsequently, the anode mixture was dispersed in an organic solvent (N-methyl-2-pyrrolidone) to obtain anode mixture slurry. Subsequently, both surfaces of the anode current collector 34A (a copper foil having a thickness of 15 μm) were uniformly coated with the anode mixture slurry, and thereafter, the anode mixture slurry was dried to form the anode active material layer 34B. Lastly, the anode active material layer 34B was compression-molded with use of a roll pressing machine, and thereafter, the anode current collector 34A on which the anode active material layer 34B was formed was cut into a strip shape (50 mm×310 mm).

An electrolytic solution was prepared as follows. A cyano compound was added into a solvent, and the solvent was stirred. As the solvent, a mixture of ethylene carbonate (EC) and diethyl carbonate (DEC) was used. A composition of the solvent (in weight ratio) was ethylene carbonate:diethyl carbonate=50:50. The kind and content (mol/kg) of the cyano compound are as illustrated in Table 1. It is to be noted that, for comparison, an electrolytic solution was prepared in a similar procedure, except that one of other compounds was used in place of the cyano compound. The kinds and contents (mol/kg) of the other compounds are as illustrated in Table 1.

The secondary battery was assembled as follows. First, the cathode lead 25 made of aluminum was attached to the cathode current collector 33A of the cathode 33 by welding, and the anode lead 26 made of copper was attached to the anode current collector 34A of the anode 34 by welding. Subsequently, the cathode 33 and the anode 34 were stacked with the separator 35 (a microporous polyethylene film having a thickness of 25 μm) in between, and the cathode 33, the anode 34, and the separator 35 were spirally wound in a longitudinal direction to fabricate the spirally wound electrode body 30. Thereafter, the protective tape 37 was attached onto the outermost periphery of the spirally wound electrode body 30. Subsequently, the spirally wound electrode body 30 was sandwiched between two film-shaped outer package members 40, and thereafter, the outer edges on three sides of the outer package members 40 were thermally fusion-bonded. Thus, a pouch was formed of the outer package members 40. The outer package members 40 used here each were a moisture-resistant aluminum laminated film in which a 25-μm-thick nylon film, a 40-μm-thick aluminum foil, and a 30-μm-thick polypropylene film were laminated in this order from outside. Lastly, the electrolytic solution was injected inside the pouch formed of the outer package members 40, and the separator 35 was impregnated with the electrolytic solution. Thereafter, outer edges on the remaining one side of the outer package members 40 were thermally fusion-bonded in a reduced-pressure environment. Thus, the laminated film type secondary batteries were completed.

When cycle characteristics, storage characteristics, load characteristics, and swollenness characteristics were examined as battery characteristics of the secondary batteries, results illustrated in Table 1 were obtained.

The cycle characteristics were examined as follows. First, one cycle of charge and discharge was performed on the secondary battery in an ambient temperature environment (23° C.) to stabilize a battery state of the secondary battery, and thereafter, one cycle of charge and discharge was further performed on the secondary battery in a high-temperature environment (60° C.) to measure discharge capacity. Subsequently, the secondary battery was repeatedly charged and discharged until the total number of cycles reached 100 cycles in the same temperature environment (60° C.) to measure discharge capacity. A cycle retention ratio (%)=(discharge capacity at the 100th cycle/discharge capacity at the second cycle)×100 was calculated from these results. When the secondary battery was charged, charge was performed at a current of 0.2 C until the voltage reached 4.35 V, and thereafter, charge was further performed at the voltage of 4.35 V until the current reached 0.05 C. When the secondary battery was discharged, discharge was performed at a current of 0.2 C until the voltage reached 2.5 V. It is to be noted that "0.2 C" refers to a current value at which the battery capacity (theoretical capacity) is completely discharged in 5 hours, and "0.05 C" refers to a current value at which the battery capacity is completely discharged in 20 hours.

The storage characteristics were examined as follows. One cycle of charge and discharge was performed, in an ambient environment (23° C.), on the secondary battery having a battery state stabilized by a similar procedure to that in a case of examining the cycle characteristics to measure discharge capacity. Subsequently, the secondary battery was charged again, and the secondary battery kept in a charged state was stored in a constant-temperature bath (80° C.) for 10 days, and thereafter, the secondary battery was discharged in the ambient temperature environment to measure discharge capacity. A storage retention ratio (%)=(discharge capacity after storage/discharge capacity before storage)×100 was calculated from these results. The charge and discharge conditions were similar to those in the case of examining the cycle characteristics.

The load characteristics were examined as follows. One cycle of charge and discharge was performed, in an ambient environment (23° C.), on the secondary battery having a battery state stabilized by a similar procedure to that in the case of examining the cycle characteristics to measure discharge capacity. Subsequently, the secondary battery was repeatedly charged and discharged in a low-temperature environment (−10° C.) until the total number of cycles reached 100 cycles to measure discharge capacity. A load retention ratio (%)=(discharge capacity at the 100th cycle/discharge capacity at the second cycle)×100 was calculated from these results. The charge and discharge conditions were similar to those in the case of examining the cycle characteristics, except that the current during discharge was changed to 1 C. It is to be noted that "1 C" refers to a current value at which the battery capacity (theoretical capacity) is completely discharged in 1 hour.

The swollenness characteristics were determined as follows. The secondary battery having a battery state stabilized by a similar procedure to the procedure of examining the cycle characteristics was charged again in the ambient temperature environment (23° C.), and thereafter, the thickness of the secondary battery was measured. Subsequently, the secondary battery kept in a charged state was stored in a high-temperature environment (60° C.) for one month, and thereafter, the thickness (mm) of the secondary battery was measured. Swollenness (mm)=the thickness after storage−the thickness before storage was calculated from these results. The charge and discharge conditions were similar to those in the case of examining the cycle characteristics.

TABLE 1

| Experimental Example | Cyano Compound Kind | Cyano Compound Content (mol/kg) | Cycle Retention Ratio (%) | Storage Retention Ratio (%) | Load Retention Ratio (%) | Swollenness (mm) |
|---|---|---|---|---|---|---|
| 1-1 | Formula (1-1) | 0.5 | 68 | 78 | 47 | 1.5 |
| 1-2 | Formula (1-2) | 0.5 | 70 | 80 | 50 | 1 |
| 1-3 | Formula (1-5) | 0.5 | 70 | 80 | 46 | 1.2 |
| 1-4 | Formula (14-1) | 0.5 | 55 | 72 | 40 | 3.5 |
| 1-5 | Formula (14-2) | 0.5 | 50 | 65 | 38 | 3.5 |

In a case in which the electrolytic solution included the cyano compound (experimental examples 1-1 to 1-3), as compared with a case in which the electrolytic solution did not include the cyano compound (experimental examples 1-4 and 1-5), the cycle retention ratio, the storage retention ratio, and the load retention ratio each were increased, and swollenness was reduced.

Experimental Examples 2-1 to 2-21

Secondary batteries were fabricated and battery characteristics (cycle characteristics and storage characteristics) of the secondary batteries were examined in a similar procedure, except that an electrolyte salt (LiPF$_6$) was added to the electrolytic solution, as illustrated in Table 2. The content (mol/kg) of the cyano compound in the electrolytic solution and the content (mol/kg) of the electrolyte salt in the electrolytic solution are as illustrated in Table 2.

TABLE 2

| Experimental Example | Cyano Compound Kind | Cyano Compound Content (mol/kg) | Electrolyte Salt Kind | Electrolyte Salt Content (mol/kg) | Cycle Retention Ratio (%) | Storage Retention Ratio (%) |
|---|---|---|---|---|---|---|
| 2-1 | Formula (1-1) | 0.01 | LiPF$_6$ | 1 | 74 | 82 |
| 2-2 | | 0.05 | | | 80 | 83 |
| 2-3 | | 0.1 | | | 88 | 85 |
| 2-4 | | 0.2 | | | 85 | 85 |
| 2-5 | | 0.5 | | | 82 | 82 |
| 2-6 | Formula (1-2) | 0.01 | LiPF$_6$ | 1 | 77 | 83 |
| 2-7 | | 0.05 | | | 85 | 83 |
| 2-8 | | 0.1 | | | 91 | 86 |
| 2-9 | | 0.2 | | | 91 | 86 |
| 2-10 | | 0.05 | | | 85 | 83 |
| 2-11 | Formula (1-5) | 0.01 | LiPF$_6$ | 1 | 77 | 84 |
| 2-12 | | 0.05 | | | 84 | 87 |
| 2-13 | | 0.1 | | | 90 | 88 |
| 2-14 | | 0.2 | | | 90 | 88 |
| 2-15 | | 0.5 | | | 86 | 85 |
| 2-16 | — | — | LiPF$_6$ | 1 | 68 | 76 |
| 2-17 | | | | 1.01 | 68 | 76 |
| 2-18 | | | | 1.05 | 68 | 77 |
| 2-19 | | | | 1.1 | 70 | 78 |
| 2-20 | | | | 1.2 | 70 | 78 |
| 2-21 | | | | 1.5 | 70 | 78 |

In a case in which the electrolytic solution included the cyano compound (experimental examples 2-1 to 2-15), as compared with a case in which the electrolytic solution did not include the cyano compound (experimental examples 2-16 to 2-21), both the cycle retention ration and the storage retention ratio were increased.

In particular, in the case in which the electrolytic solution included the cyano compound, when the content of the cyano compound in the electrolytic solution was from 0.01 mol/kg to 0.5 mol/kg both inclusive, a high cycle retention ratio and a high storage retention ratio were obtained.

Experimental Examples 3-1 to 3-5

Secondary batteries were fabricated and battery characteristics (cycle characteristics and storage characteristics) of the secondary batteries were examined in a similar procedure, except that the composition of the solvent in a case in which the electrolytic solution included the electrolyte salt (LiPF$_6$) was changed, as illustrated in Table 3. In this case, in place of diethyl carbonate (DEC), propylene carbonate (PC), dimethyl carbonate (DMC), and ethyl methyl carbonate (EMC) were used. Moreover, a mixture of solvents of three kinds was used, and the composition of the solvents was EC:PC:DEC=50:50:50 and EC:PC:EMC=50:50:50 in weight ratio.

TABLE 3

| Experimental Example | Solvent | Cyano Compound Kind | Cyano Compound Content (mol/kg) | Electrolyte Salt Kind | Electrolyte Salt Content (mol/kg) | Cycle Retention Ratio (%) | Storage Retention Ratio (%) |
|---|---|---|---|---|---|---|---|
| 2-3 | EC + DEC | Formula (1-1) | 0.1 | LiPF$_6$ | 1 | 88 | 85 |
| 3-1 | EC + PC | | | | | 82 | 85 |
| 3-2 | EC + DMC | | | | | 88 | 85 |
| 3-3 | EC + EMC | | | | | 88 | 85 |
| 3-4 | EC + PC + DEC | | | | | 85 | 86 |
| 3-5 | EC + PC + EMC | | | | | 85 | 86 |

Even in a case in which the composition of the solvent was changed, when the electrolytic solution included the cyano compound, a high cycle retention ratio and a high storage retention ratio were obtained.

Experimental Examples 4-1 to 4-15

Secondary batteries were fabricated and battery characteristics (cycle characteristics and storage characteristics) of the secondary batteries were examined in a similar procedure, except that in the case in which the electrolytic solution included the electrolyte salt (LiPF$_6$), one of other materials was added to the electrolytic solution, as illustrated in Table 4.

The following materials were used as the other materials. As the unsaturated cyclic carbonate ester, vinylene carbonate (VC), vinyl ethylene carbonate (VEC), and methylene ethylene carbonate (MEC) were added. As the halogenated carbonate ester, 4-fluoro-1,3-dioxolane-2-one (FEC) and 4,5-difluoro-1,3-dioxolane-2-one (DFEC) were added. As the monosulfonate ester, propane sultone (PS) and propene sultone (PRS) were added. As the disulfonate ester, the compound (OSAH) represented by the formula (7-2) was added. As the acid anhydride, succinic anhydride (SA) and propanedisulfonic anhydride (PSAH) were added. As the dicyano compound, succinonitrile (SN) was added. As the diisocyanate compound, hexamethylene diisocyanate (HMI) was added. In addition, as an additional electrolyte salt, lithium tetrafluoroborate (LiBF$_4$), the compound (LiBOB) represented by the formula (8-6), and lithium bis(fluorosulfonyl)imide (LiFSI) were used. The contents (wt %) of the other materials in the electrolytic solution are as illustrated in Table 4.

As can be seen from the results illustrated in Tables 1 to 4, when the electrolytic solution included the cyano compound, the cycle characteristics, the storage characteristics, the load characteristics, and swollenness characteristics were all improved. Accordingly, superior battery characteristics were achieved in the secondary battery.

Although the present technology has been described above referring to some embodiments and examples, the present technology is not limited thereto, and may be modified in a variety of ways.

For example, the description has been given with reference to examples in which the battery structure is of the cylindrical type and the laminated film type, and the battery element has the spirally wound structure. However, the battery structure and the battery element structure are not limited thereto. The secondary battery of the present technology is similarly applicable also to a case in which other battery structure such as that of a square type, a coin type, or a button type is employed. Moreover, the secondary battery of the present technology is similarly applicable also to a case in which the battery element has other structure such as a stacked structure.

Further, application of the secondary battery-use electrolytic solution of the present technology is not limited to the secondary battery. The secondary battery-use electrolytic solution of the present technology may be applicable to other electrochemical devices. Examples of the other electrochemical devices may include a capacitor.

Note that the effects described in the present specification are illustrative and non-limiting. The technology may have effects other than those described in the present specification.

TABLE 4

| Experimental Example | Cyano Compound Kind | Content (mol/kg) | Electrolyte Salt Kind | Content (mol/kg) | Other Material Kind | Content (wt %) | Cycle Retention Ratio (%) | Storage Retention Ratio (%) |
|---|---|---|---|---|---|---|---|---|
| 2-3 | Formula (1-1) | 0.1 | LiPF$_6$ | 1 | — | — | 88 | 85 |
| 4-1 |  |  |  |  | VC | 2 | 90 | 87 |
| 4-2 |  |  |  |  | VEC | 2 | 90 | 88 |
| 4-3 |  |  |  |  | MEC | 2 | 90 | 88 |
| 4-4 |  |  |  |  | FEC | 2 | 92 | 85 |
| 4-5 |  |  |  |  | DFEC | 2 | 89 | 85 |
| 4-6 |  |  |  |  | PS | 0.5 | 89 | 92 |
| 4-7 |  |  |  |  | PRS | 0.5 | 89 | 92 |
| 4-8 |  |  |  |  | OSAH | 0.5 | 89 | 90 |
| 4-9 |  |  |  |  | SA | 0.5 | 90 | 88 |
| 4-10 |  |  |  |  | PSAH | 0.5 | 92 | 93 |
| 4-11 |  |  |  |  | SN | 0.5 | 89 | 92 |
| 4-12 |  |  |  |  | HMI | 0.5 | 89 | 88 |
| 4-13 |  |  |  |  | LiBF$_4$ | 0.05 | 86 | 86 |
| 4-14 |  |  |  |  | LiBOB | 0.05 | 90 | 89 |
| 4-15 |  |  |  |  | LiFSI | 0.05 | 88 | 90 |

Even in a case in which the electrolytic solution included the other material, when the electrolytic solution included the cyano compound, a high cycle retention ratio and a high storage retention ratio were obtained. In particular, in a case in which the electrolytic solution included the other material, as compared with a case in which the electrolytic solution did not include the other material, a substantially equal or higher cycle retention ratio and an equal or higher storage retention ratio were obtained.

It is to be noted that the present technology may have the following configurations.

(1)

A secondary battery, including:

a cathode;

an anode; and an electrolytic solution including a cyano compound represented by the following formula (1),

[Chem. 24]

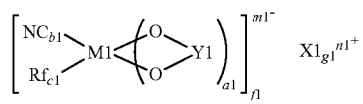
(1)

where $X1^{n1+}$ is one of a metal ion and an onium ion, M1 is one of transition metal elements, and Group 13 elements, Group 14 elements, and Group 15 elements in the long form of the periodic table of the elements, Rf is one of a fluorine group and a monovalent fluorinated hydrocarbon group, Y1 is one of —C(=O)—(CR1$_2$)$_{d1}$-C(=O)—, —CR2$_2$-(CR3$_2$)$_{e1}$-C(=O)—, —S(=O)$_2$—(CR3$_2$)$_{e1}$-S(=O)$_2$—, —CR2$_2$-(CR3$_2$)$_{e1}$-S(=O)$_2$—, —C(=O)—(CR3$_2$)$_{e1}$-S(=O)$_2$—, and —CR2$_2$-(CR3$_2$)$_{e1}$-CR2$_2$-, each of R1's is one of a hydrogen group (—H), a fluorine group (—F), a monovalent hydrocarbon group, and a monovalent fluorinated hydrocarbon group, and one or more of R1's is one of the fluorine group and the monovalent fluorinated hydrocarbon group, each of R2's is one of a hydrogen group, a fluorine group, a monovalent hydrocarbon group, and a monovalent fluorinated hydrocarbon group, each of R3's is one of a hydrogen group, a fluorine group, a monovalent hydrocarbon group, and a monovalent fluorinated hydrocarbon group, each of a1, f1, and n1 is an integer of 1 or 2, each of b1 and d1 is an integer of 1 to 4, c1 is an integer of 0 to 3, e1 is an integer of 0 to 4, and each of g1 and m1 is an integer of 1 to 3.

(2)
The secondary battery according to (1), wherein the X1 is one of the Group 1 elements and the Group 2 elements in the long form of the periodic table of the elements.

(3)
The secondary battery according to (1) or (2), wherein the X1 is lithium (Li).

(4)
The secondary battery according to any one of (1) to (3), wherein the M1 is one of boron (B), phosphorus (P), and aluminum (Al).

(5)
The secondary battery according to any one of (1) to (4), wherein
the monovalent hydrocarbon group is one of an alkyl group, an alkenyl group, an alkynyl group, a cycloalkyl group, an aryl group, and a monovalent group in which two or more of the alkyl group, the alkenyl group, the alkynyl group, the cycloalkyl group, and the aryl group are bound, and
the monovalent fluorinated hydrocarbon group is a group in which one or more hydrogen groups in the monovalent hydrocarbon group are substituted by a fluorine group.

(6)
The secondary battery according to any one of (1) to (5), wherein
the Rf is the monovalent fluorinated hydrocarbon group, and
the number of carbons in the monovalent fluorinated hydrocarbon group is from 1 to 10 both inclusive.

(7)
The secondary battery according to any one of (1) to (6), wherein a content of the cyano compound in the electrolytic solution is from 0.01 mol/kg to 0.5 mol/kg both inclusive.

(8)
The secondary battery according to any one of (1) to (7), wherein the secondary battery is a lithium-ion secondary battery.

(9)
A secondary battery-use electrolytic solution, including: a cyano compound represented by the following formula (1),

[Chem. 25]

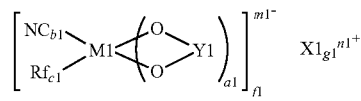
(1)

where $X1^{n1+}$ is one of a metal ion and an onium ion, M1 is one of transition metal elements, and Group 13 elements, Group 14 elements, and Group 15 elements in the long form of the periodic table of the elements, Rf is one of a fluorine group and a monovalent fluorinated hydrocarbon group, Y1 is one of —C(=O)—(CR1$_2$)$_{d1}$-C(=O)—, —CR2$_2$-(CR3$_2$)$_{e1}$-C(=O)—, —S(=O)$_2$—(CR3$_2$)$_{e1}$-S(=O)$_2$—, —CR2$_2$-(CR3$_2$)$_{e1}$-S(=O)$_2$—, —C(=O)—(CR3$_2$)$_{e1}$-S(=O)$_2$—, and —CR2$_2$-(CR3$_2$)$_{e1}$-CR2$_2$-, each of R1's is one of a hydrogen group (—H), a fluorine group (—F), a monovalent hydrocarbon group, and a monovalent fluorinated hydrocarbon group, and one or more of R1's is one of the fluorine group and the monovalent fluorinated hydrocarbon group, each of R2's is one of a hydrogen group, a fluorine group, a monovalent hydrocarbon group, and a monovalent fluorinated hydrocarbon group, each of R3's is one of a hydrogen group, a fluorine group, a monovalent hydrocarbon group, and a monovalent fluorinated hydrocarbon group, each of a1, f1, and n1 is an integer of 1 or 2, each of b1 and d1 is an integer of 1 to 4, c1 is an integer of 0 to 3, e1 is an integer of 0 to 4, and each of g1 and m1 is an integer of 1 to 3.

(10)
A battery pack including:
the secondary battery according to any one of (1) to (8);
a controller that controls an operation of the secondary battery; and
a switch section that switches the operation of the secondary battery in accordance with an instruction from the controller.

(11)
An electric vehicle including:
the secondary battery according to any one of (1) to (8);
a converter that converts electric power supplied from the secondary battery into drive power;
a drive section that operates in accordance with the drive power; and
a controller that controls an operation of the secondary battery.

(12)
An electric power storage system including:
the secondary battery according to any one of (1) to (8);
one or more electric devices that are supplied with electric power from the secondary battery; and
a controller that controls the supplying of the electric power from the secondary battery to the one or more electric devices.

(13)
An electric power tool including:
the secondary battery according to any one of (1) to (8); and a movable section that is supplied with electric power from the secondary battery.

(14)

An electronic apparatus including the secondary battery according to any one of (1) to (8) as an electric power supply source.

The present application is based on and claims priority from Japanese Patent Application No. 2014-253927 filed in the Japan Patent Office on Dec. 16, 2014, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A secondary battery, comprising:
a cathode;
an anode; and
an electrolytic solution including a cyano compound represented by the following formula (1),

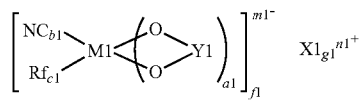
(1)

where $X1^{n1+}$ is one of a metal ion and an onium ion, M1 is one of transition metal elements, and Group 13 elements, Group 14 elements, and Group 15 elements in the long form of the periodic table of the elements, Rf is one of a fluorine group and a monovalent fluorinated hydrocarbon group, Y1 is one of —C(=O)—(CR1$_2$)$_{d1}$-C(=O)—, —CR2$_2$-(CR3$_2$)$_{e1}$-C(=O)—, —S(=O)$_2$—(CR3$_2$)$_{e1}$-S(=O)$_2$—, —CR2$_2$-(CR3$_2$)$_{e1}$-S(=O)$_2$—, —C(=O)—(CR3$_2$)$_{e1}$-S(=O)$_2$—, and —CR2$_2$-(CR3$_2$)$_{e1}$-CR2$_2$-, each of R1's is one of a fluorine group (—F), a monovalent hydrocarbon group, and a monovalent fluorinated hydrocarbon group, each of R2's is one of a hydrogen group, a fluorine group, a monovalent hydrocarbon group, and a monovalent fluorinated hydrocarbon group, each of R3's is one of a hydrogen group, a fluorine group, a monovalent hydrocarbon group, and a monovalent fluorinated hydrocarbon group, each of a1, f1, and n1 is an integer of 1 or 2, each of b1 and d1 is an integer of 1 to 4, c1 is an integer of 0 to 3, e1 is an integer of 0 to 4, and each of g1 and m1 is an integer of 1 to 3.

2. The secondary battery according to claim 1, wherein the X1 is one of the Group 1 elements and the Group 2 elements in the long form of the periodic table of the elements.

3. The secondary battery according to claim 1, wherein the X1 is lithium (Li).

4. The secondary battery according to claim 1, wherein the M1 is one of boron (B), phosphorus (P), and aluminum (Al).

5. The secondary battery according to claim 1, wherein the monovalent hydrocarbon group is one of an alkyl group, an alkenyl group, an alkynyl group, a cycloalkyl group, an aryl group, and a monovalent group in which two or more of the alkyl group, the alkenyl group, the alkynyl group, the cycloalkyl group, and the aryl group are bound, and the monovalent fluorinated hydrocarbon group is a group in which one or more hydrogen groups in the monovalent hydrocarbon group are substituted by a fluorine group.

6. The secondary battery according to claim 1, wherein the Rf is the monovalent fluorinated hydrocarbon group, and
the number of carbons in the monovalent fluorinated hydrocarbon group is from 1 to 10 both inclusive.

7. The secondary battery according to claim 1, wherein a content of the cyano compound in the electrolytic solution is from 0.01 mol/kg to 0.5 mol/kg both inclusive.

8. The secondary battery according to claim 1, wherein the secondary battery is a lithium-ion secondary battery.

9. An electrolytic solution for a secondary battery, the electrolytic solution comprising:
a cyano compound represented by the following formula (1),

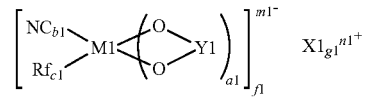
(1)

where $X1^{n1+}$ is one of a metal ion and an onium ion, M1 is one of transition metal elements, and Group 13 elements, Group 14 elements, and Group 15 elements in the long form of the periodic table of the elements, Rf is one of a fluorine group and a monovalent fluorinated hydrocarbon group, Y1 is one of —C(=O)—(CR1$_2$)$_{d1}$-C(=O)—, —CR2$_2$-(CR3$_2$)$_{e1}$-C(=O)—, —S(=O)$_2$—(CR3$_2$)$_{e1}$-S(=O)$_2$—, —CR2$_2$-(CR3$_2$)$_{e1}$-S(=O)$_2$—, —C(=O)—(CR3$_2$)$_{e1}$-S(=O)$_2$—, and —CR2$_2$-(CR3$_2$)$_{e1}$-CR2$_2$-, each of R1's is one of a fluorine group (—F), a monovalent hydrocarbon group, and a monovalent fluorinated hydrocarbon group, each of R2's is one of a hydrogen group, a fluorine group, a monovalent hydrocarbon group, and a monovalent fluorinated hydrocarbon group, each of R3's is one of a hydrogen group, a fluorine group, a monovalent hydrocarbon group, and a monovalent fluorinated hydrocarbon group, each of a1, f1, and n1 is an integer of 1 or 2, each of b1 and d1 is an integer of 1 to 4, c1 is an integer of 0 to 3, e1 is an integer of 0 to 4, and each of g1 and m1 is an integer of 1 to 3.

10. A battery pack comprising:
the secondary battery according to claim 1;
a controller that controls an operation of the secondary battery; and
a switch section that switches the operation of the secondary battery in accordance with an instruction from the controller

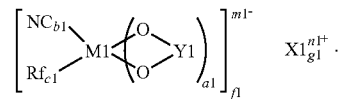
(1)

11. An electric vehicle comprising:
the secondary battery according to claim 1;
a converter that converts electric power supplied from the secondary battery into drive power;

a drive section that operates in accordance with the drive power; and a controller that controls an operation of the secondary battery;

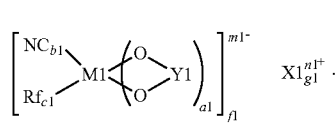 (1)

12. An electric power storage system comprising:
the secondary battery according to claim 1;
one or more electric devices that are supplied with electric power from the secondary battery; and
a controller that controls the supplying of the electric power from the secondary battery to the one or more electric devices

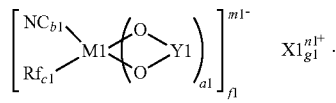 (1)

13. An electric power tool comprising:
the secondary battery according to claim 1; and
a movable section that is supplied with electric power from the secondary battery

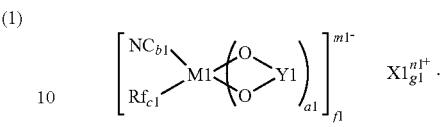 (1)

14. An electronic apparatus comprising the secondary battery according to claim 1 as an electric power supply source

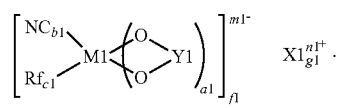 (1)

15. The secondary battery according to claim 1, wherein one of R1 is a hydrogen group (—H).

16. The electrolytic solution according to claim 9, wherein one of R1 is a hydrogen group (—H).

* * * * *